(12) United States Patent
Ko et al.

(10) Patent No.: US 11,422,666 B2
(45) Date of Patent: *Aug. 23, 2022

(54) ELECTRONIC DEVICE INCLUDING TOUCH SENSOR IC AND OPERATION METHOD THEREOF

(71) Applicant: Samsung Electronics Co., Ltd., Suwon-si (KR)

(72) Inventors: Seunghoon Ko, Suwon-si (KR); Hoondo Heo, Suwon-si (KR); Dongchul Kim, Suwon-si (KR); Jooyoung Park, Suwon-si (KR); Eunsung Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/562,556

(22) Filed: Dec. 27, 2021

(65) Prior Publication Data

US 2022/0121324 A1    Apr. 21, 2022

Related U.S. Application Data

(63) Continuation of application No. 17/168,881, filed on Feb. 5, 2021, now Pat. No. 11,209,949.

(30) Foreign Application Priority Data

Feb. 7, 2020    (KR) .................. 10-2020-0014930

(51) Int. Cl.
    *G06F 3/044* (2006.01)
    *G06F 3/041* (2006.01)

(52) U.S. Cl.
    CPC .......... *G06F 3/0447* (2019.05); *G06F 3/0412* (2013.01); *G06F 3/0443* (2019.05); *G06F 3/04166* (2019.05)

(58) Field of Classification Search
    CPC .. G06F 3/0447; G06F 3/04166; G06F 3/0443; G06F 3/0412
    See application file for complete search history.

(56) References Cited

U.S. PATENT DOCUMENTS

11,003,278 B2    5/2021 Kim et al.
11,209,949 B2 *  12/2021 Ko ..................... G06F 3/0443
(Continued)

FOREIGN PATENT DOCUMENTS

KR    10-2017-0071685 A    6/2017

OTHER PUBLICATIONS

International Search Report with Written Opinion dated Apr. 29, 2021; International Appln. No. PCT/KR2021/001522.

*Primary Examiner* — Ricardo Osorio
(74) *Attorney, Agent, or Firm* — Jefferson IP Law, LLP

(57) ABSTRACT

An electronic device according is provided. The electronic device includes a touch sensor, a touch sensor integrated circuit (IC) configured to identify an input position on the touch sensor, a display, and a display driving IC configured to provide, to the display, at least one driving signal for driving the display, wherein the touch sensor IC is configured to measure, based on a first schedule, the input position on the touch sensor while a first driving signal among the at least one driving signal is provided from the display driving IC in a first interval, the first schedule being configured such that the at least one driving signal does not overlap a time period of the measurement of the input position, detect, based on a change of an interval of the first driving signal from the first interval to a second interval, an event in which a time period of the first driving signal being provided at least partially overlaps the time period of the measurement (Continued)

of the input position, and measure the input position, based on a second schedule which is different from the first schedule.

20 Claims, 16 Drawing Sheets

(56) References Cited

U.S. PATENT DOCUMENTS

| | | |
|---|---|---|
| 2010/0045631 A1 | 2/2010 | Chen et al. |
| 2014/0240281 A1 | 8/2014 | Lee |
| 2015/0077390 A1 | 3/2015 | Kim et al. |
| 2016/0147350 A1 | 5/2016 | Kida et al. |
| 2016/0299618 A1 | 10/2016 | Liu et al. |
| 2016/0357327 A1 | 12/2016 | Chang et al. |
| 2017/0060337 A1 | 3/2017 | Kim et al. |
| 2018/0032202 A1 | 2/2018 | Kim et al. |
| 2018/0107300 A1 | 4/2018 | Lin et al. |
| 2018/0150178 A1* | 5/2018 | Kim .................. G06F 3/04166 |
| 2019/0179475 A1 | 6/2019 | Seo et al. |
| 2020/0167026 A1 | 5/2020 | Lee et al. |
| 2020/0201480 A1 | 6/2020 | Choi et al. |
| 2020/0326815 A1 | 10/2020 | Choi et al. |

* cited by examiner

ELECTRONIC DEVICE INCLUDING TOUCH SENSOR IC AND OPERATION METHOD THEREOF

CROSS-REFERENCE TO RELATED APPLICATION(S)

This application is a continuation application of prior application Ser. No. 17/168,881, filed on Feb. 5, 2021, which application is based on and claims priority under 35 U.S.C. § 119(a) of a Korean patent application number 10-2020-0014930, filed on Feb. 7, 2020, in the Korean Intellectual Property Office, the disclosure of which is incorporated by reference herein in its entirety.

BACKGROUND

1. Field

The disclosure relates to an electronic device including a touch sensor integrated circuit (IC) and an operation method thereof.

2. Description of Related Art

Electronic devices including touchscreens have been widely introduced. An electronic device may display a screen including an object on a touchscreen. A user may touch a point on the touchscreen with a finger or a stylus pen, and the electronic device may sense the position of the touch on the touchscreen. The electronic device may perform a function associated with the object corresponding to the sensed position, thereby providing a user-friendly user interface such that the user can manipulate the electronic device solely by a touch.

The touchscreen may include a touch panel including multiple electrodes. The electrodes may be conductors, and a mutual capacitance may thus be formed between the electrodes. For example, if a capacitive-type touch panel is implemented, the electronic device may apply a driving signal to at least one electrode (i.e., driving electrode) of the touch panel, and the driving electrode may then form an electric field. Other electrodes may output an electric signal, based on the electric field formed by the driving electrode. Meanwhile, when the user positions a finger near at least one electrode, the magnitude of the electric signal output by the electrode positioned near the finger may change and differ from the previous value. The electronic device may sense a change in the mutual capacitance, based on the changed magnitude, and may sense the position of the touch, based on the electrodes, the mutual capacitance of which has changed.

Alternatively, the electronic device may measure the self-capacitance with regard to each electrode. The electronic device may determine the position of the touch, based on the measured self-capacitance, or may determine information other than the identified touch, based on the mutual capacitance.

The above information is presented as background information only to assist with an understanding of the disclosure. No determination has been made, and no assertion is made, as to whether any of the above might be applicable as prior art with regard to the disclosure.

SUMMARY

An electronic device may include a touch sensor and a display. In line with the increasing popularity of small electronic devices that are thin, the physical distance between the touch sensor and the display tends to decrease. If the distance between the touch sensor and the display is small, a signal applied to the touch sensor may be directed to the display as noise, or a display driving signal may be directed to the touch sensor as noise. The electronic device may conduct synchronization such that there is at least a predetermined time difference between the time period in which a display driving signal is applied and the time period in which a touch sensor IC performs measurement. For example, if the display driving signal is applied in a first interval, the touch sensor IC may measure an input position while being synchronized with the first interval, thereby reducing the possibility that sensitivity of the touch sensor or image quality of the display will be degraded due to noise.

The electronic device may change the interval of the display driving signal with regard to each display mode. However, since the touch sensor IC performs measurement while being synchronized with the fixed interval of the display driving signal, noise cannot be prevented if the interval is changed. There is no disclosed scheme for reducing noise in response to a change in the interval of the display driving signal.

Aspects of the disclosure are to address at least the above-mentioned problems and/or disadvantages and to provide at least the advantages described below. Accordingly, an aspect of the disclosure is to provide an electronic device and a method for operating the same that may change the position measurement scheduling in response to a change in the interval of the display driving signal.

Additional aspects will be set forth in part in the description which follows and, in part, will be apparent from the description, or may be learned by practice of the presented embodiments.

In accordance with an aspect of the disclosure, an electronic device is provided. The electronic device includes a touch sensor, a touch sensor IC configured to identify an input position on the touch sensor, a display, and a display driving IC configured to provide, to the display, at least one driving signal for driving the display. The touch sensor IC may be configured to measure, based on a first schedule, the input position on the touch sensor while a first driving signal among the at least one driving signal is provided from the display driving IC in a first interval, the first schedule being configured such that the at least one driving signal does not overlap a time period of the measurement of the input position, detect, based on a change of an interval of the first driving signal from the first interval to a second interval, an event in which the time period of the first driving signal being provided at least partially overlaps the time period of the measurement of the input position, and based on detecting the event, measuring the input position based on a second schedule which is different from the first schedule.

In accordance with another aspect of the disclosure, an operation method of an electronic device is provided. The operation method includes a touch sensor, a touch sensor IC configured to identify an input position on the touch sensor, a display, and a display driving IC configured to provide, to the display, at least one driving signal for driving the display may include the operations of measuring, based on a first schedule, the input position on the touch sensor while a first driving signal among the at least one driving signal is provided from the display driving IC in a first interval, the first schedule being configured such that the at least one driving signal does not overlap a time period of the measurement of the input position, detecting, based on a change of an interval of the first driving signal from the first interval to a second interval, an event in which the time period of the first driving signal being provided at least partially overlaps the time period of the measurement of the input position, and based on detecting the event, measuring the input position based on a second schedule which is different from the first schedule.

In accordance with another aspect of the disclosure, a structure is provided. The structure includes a substrate on which a thin film transistor (TFT) structure for displaying at least one screen is disposed, an encapsulation layer disposed on the TFT structure, a touch sensor disposed on the encapsulation layer, and an integrated circuit configured to identify an input position on the touch sensor and provide at least one driving signal to the TFT structure. The integrated circuit may be configured to measure, based on a first schedule, the input position on the touch sensor while a first driving signal among the at least one driving signal is provided in a first interval, the first schedule being configured such that the at least one driving signal does not overlap a time period of the measurement of the input position, detect, based on a change of an interval of the first driving signal from the first interval to a second interval, an event in which the time period of the first driving signal being provided at least partially overlaps the time period of the measurement of the input position, and measure the input position, based on a second schedule which is different from the first schedule.

According to various embodiments, there may be provided an electronic device and a method for operating the same, wherein the position measurement scheduling can be changed in response to a change in the period of the display driving signal. Accordingly, noise that may affect the touch sensor or the display can be reduced even in the case of multiple display driving signals.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
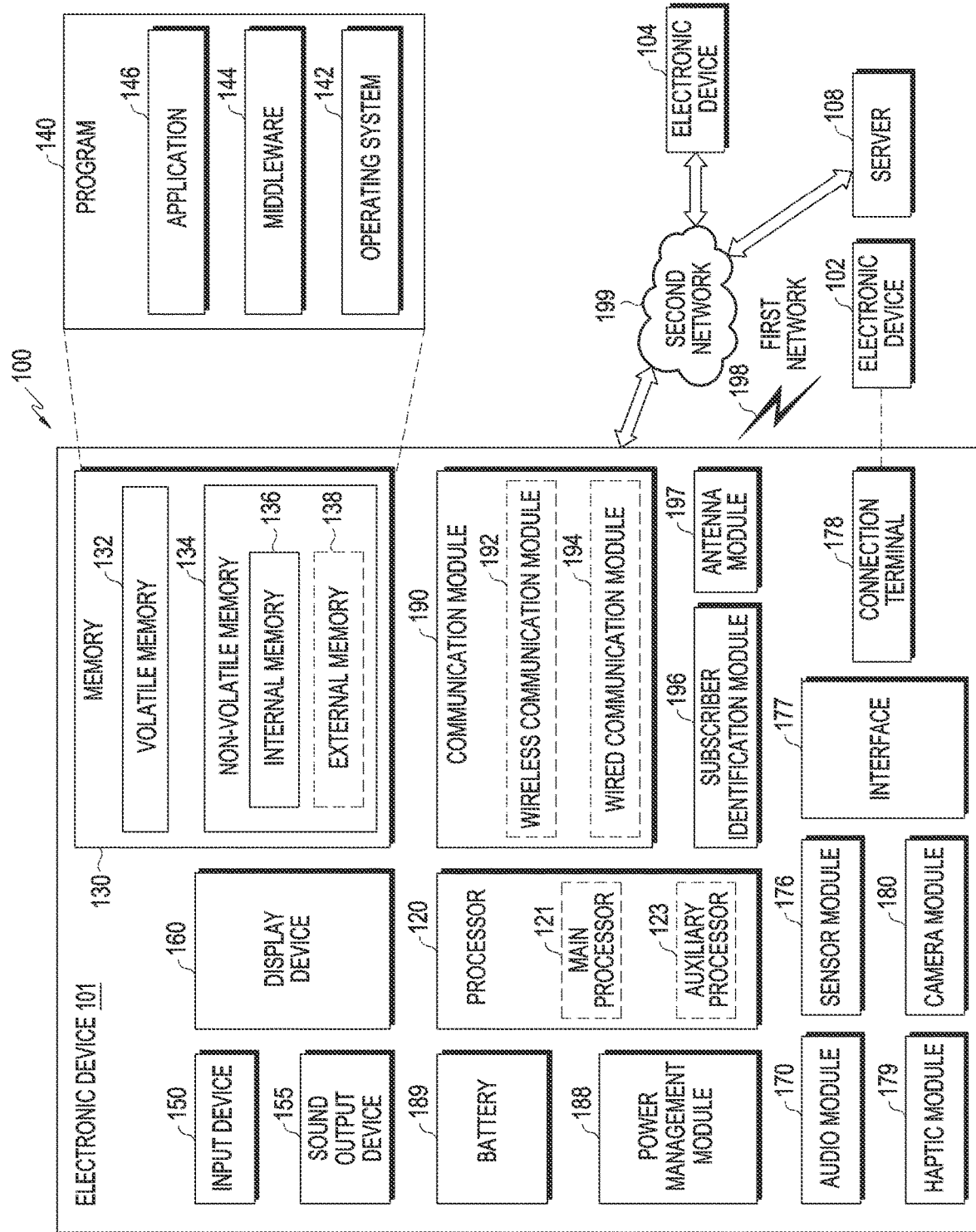
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The non-volatile memory 134 includes an internal memory 136 and an external memory 138. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
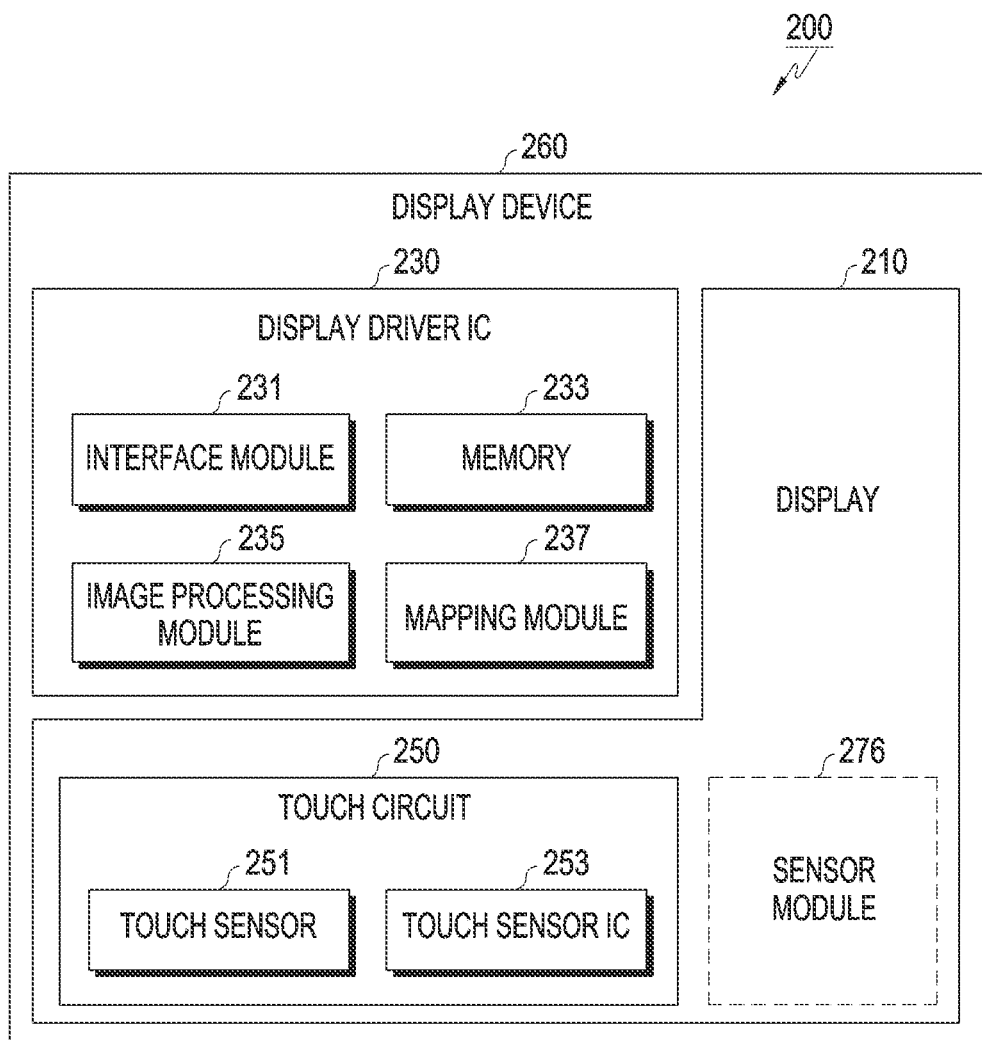
FIG. 2 is a block diagram illustrating a display device according to an embodiment of the disclosure.

FIG. 2 is a block diagram illustrating the display device according to an embodiment of the disclosure.

Referring to FIG. 2, in a device 200, a display device 260, forming the display device 160 of FIG. 1, may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 276 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment, the display device 260 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 260.

According to an embodiment, the display device 260 may further include at least one sensor (e.g., a fingerprint sensor, an iris sensor, a pressure sensor, or an illuminance sensor) of the sensor module 276 or a control circuit for the at least one sensor. In such a case, the at least one sensor or the control circuit for the at least one sensor may be embedded in one portion of a component (e.g., the display 210, the DDI 230, or the touch circuitry 250)) of the display device 260. For example, when the sensor module 276 embedded in the display device 260 includes a biometric sensor (e.g., a fingerprint sensor), the biometric sensor may obtain biometric information (e.g., a fingerprint image) corresponding to a touch input received via a portion of the display 210. As another example, when the sensor module 276 embedded in the display device 260 includes a pressure sensor, the pressure sensor may obtain pressure information corresponding to a touch input received via a partial or whole area of the display 210. According to an embodiment, the touch sensor 251 or the sensor module 276 may be disposed between pixels in a pixel layer of the display 210, or over or under the pixel layer.

According to various embodiments, at least part of the DDI 230 and at least part of the touch sensor IC 253 may be implemented as an integrated IC.

Figure 3:
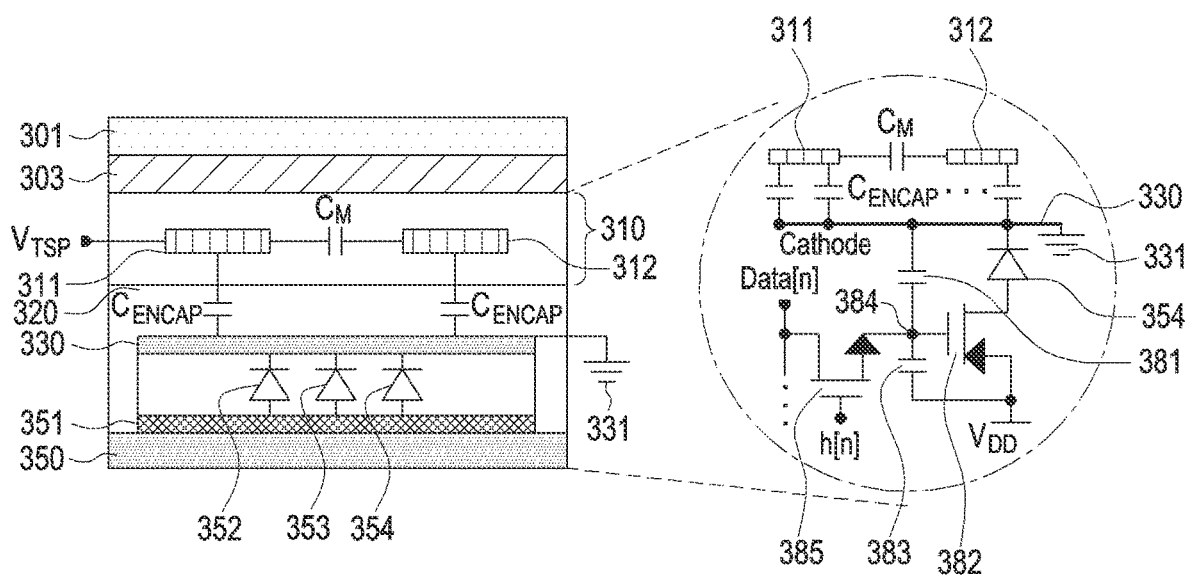
FIG. 3 illustrates a configuration of at least a part of an electronic device according to an embodiment of the disclosure.

FIG. 3 illustrates a configuration of at least a part of an electronic device according to an embodiment of the disclosure.

Referring to FIG. 3, the electronic device 101 may include the display device 260 having an on-cell structure. The display device 260 may include a window 301 for accommodating an internal element. The window 301 may be made of a substantially transparent material such as glass, but the material thereof is not limited. The window 301 may cover substantially the entire region of the display 210. The display device 260 may include a polarizing layer 303 beneath the window 301. In various embodiments, those skilled in the art will understand that disposing an element beneath or on another element may refer to displaying two elements so as to be in contact with each other, and may also refer to displaying two elements with an intermediate element therebetween.

According to various embodiments, a touch sensor 310 (e.g., the touch sensor 251) may be disposed beneath the polarizing layer 303. The touch sensor 310 may include multiple electrodes 311 and 312. Referring to FIG. 3, two electrodes 311 and 312 are illustrated for convenience of a description. However, those skilled in the art will understand that the touch sensor 310 may include multiple electrodes extending in a first axis direction and multiple electrodes extending in a second axis direction, and that insulation materials may be disposed at points at which the multiple electrodes extending to the corresponding axis direction cross each other. The electrodes 311 and 312 may be formed of, for example, a metal-mesh, but the material and/or shape thereof are not limited. Mutual capacitance $C_M$ may be formed between the electrodes 311 and 312.

According to various embodiments, an encapsulation layer 320 may be disposed beneath the touch sensor 310. In the electronic device 101, the encapsulation layer 320 may include, for example, encapsulation glass or an encapsulation thin film, and the encapsulation thin film may be implemented using a flexible organic material, but the type thereof is not limited. When the encapsulation thin film is implemented using a flexible organic material, the entirety of the display device 260 may be flexible. A structure in which the encapsulation thin film accommodates a display element may be called YOUM on-cell touch active matrix organic light emitting diodes (AMOLED) (Y-OCTA), but this is only an example. Thus, those skilled in the art will understand that various embodiments are applicable to a predetermined touch sensor in addition to an on-cell structure such as Y-OCTA. The encapsulation layer 320 may accommodate a substrate 350, a thin film transistor (TFT) structure 351, multiple diodes (e.g., AMOLED) 352, 353, and 354, and a ground plate (e.g., ground layer) 330. Encapsulation capacitance ($C_{ENCAP}$) may be formed between the ground plate 330 and the electrodes 311 and 312. When the encapsulation layer 320 is thin or is replaced with an encapsulation thin film, the distance between the ground plate 330 and the electrodes 311 and 312 may also be reduced, and encapsulation capacitance may have a relatively large value.

Referring to the circuit diagram in FIG. 3, on the basis of provision of a horizontal line update signal (h[n]) to a gate of a transistor 385, data (Data[n]) for a display may be transferred to a node 384 via the transistor 385. A capacitor 381, a capacitor 383, a diode 354, and a transistor 382 may be connected to the node 384, and VDD may be applied to the capacitor 383 and the transistor 382. The diode 354 and the capacitor 381 may be connected to the ground plate 330 which is connected to a ground 331. The ground plate 330 may be connected to, for example, the diode 354, and may serve as a negative electrode (cathode). As described above, encapsulation capacitance ($C_{ENCAP}$) is formed between the ground plate 330 and the electrodes 311 and 312, and thus it may be construed that the electrodes 311 and 312 are connected to elements for a display in terms of a circuit. Therefore, in an interval in which the horizontal line update signal (h[n]) is high, the data for display (Data[n]) may be introduced into the electrodes 311 and 312. This may have an influence on mutual capacitance $C_M$ between the electrodes 311 and 312 and/or self-capacitance of each of the electrodes 311 and 312. An input position is determined based on changes in the mutual capacitance $C_M$ and/or the self-capacitance of each of the electrodes 311 and 312, and thus the influence on the mutual capacitance $C_M$ and/or the self-capacitance of each of the electrodes 311 and 312 may reduce the accuracy of input position measurement. Alternatively, electrical signals provided to the electrodes 311 and 312 may also be introduced into a gate of the transistor 382. When a voltage of the gate is affected, the amount of light output from the diode 354 may also be affected, and thus image quality may be low. Therefore, in order to prevent the introduction of noise, it is required that a display driving signal and a time period of input position measurement are configured so as not to overlap each other.

Figure 4:
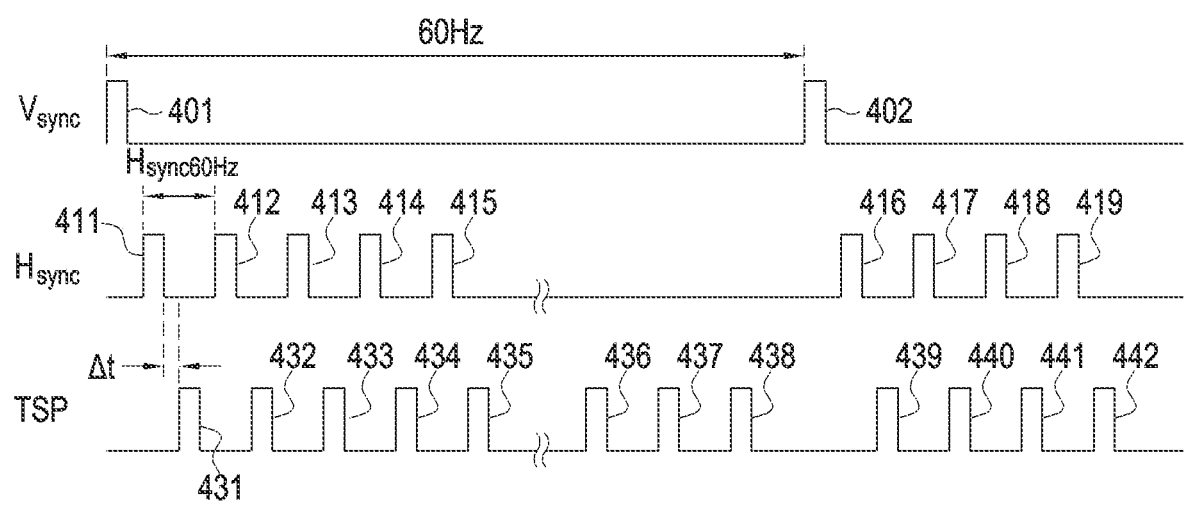
FIG. 4 is a view for describing a timing in which a display driving signal is synchronized with a time period of input position measurement according to an embodiment of the disclosure.

FIG. 4 is a view for describing a timing in which a display driving signal is synchronized with a time period of input position measurement according to an embodiment of the disclosure.

Referring to FIG. 4, the DDI 230 may provide vertical synchronization signals (Vsync) 401 and 402 in a first period (e.g., first interval) (e.g., (1/60 hertz (Hz))s). The DDI 230 may provide horizontal synchronization signals (Hsync) 411, 412, 413, 414, 415, 416, 417, 418, and 419 at a period of Hsync 60 Hz. The period of Hsync 60 Hz may be the period of the horizontal synchronization signal when the period of a vertical synchronization signal is (1/60 Hz)s, and may be shorter than (1/60 Hz)s. If the period of a vertical synchronization signal is changed to (1/120 Hz)s, the period of a horizontal synchronization signal may also be adjusted to Hsync 120 Hz. The period of Hsync 120 Hz may be shorter than the period of Hsync 60 Hz.

According to various embodiments, the display 210 may display one image frame including multiple horizontal lines, based on, for example, the reception of a vertical synchronization signal 401. The display 210 may perform horizontal line update based on, for example, the horizontal synchronization signals 411, 412, 413, 414, and 415. In the embodiment illustrated, referring to FIG. 4, after the vertical synchronization signal 401 is provided, the horizontal synchronization signals 411, 412, 413, 414, and 415 are provided for a predetermined time, and then no horizontal synchronization signal is provided until a next vertical synchronization signal 402 is provided. After the vertical synchronization signal 401 is provided as described above, a display update may be performed for a time shorter than a time period from the provision of the synchronization signal 401 until the next vertical synchronization signal 402, but those skilled in the art will understand that various embodiments are not limited thereto. For example, the DDI 230 may be configured to provide the vertical synchronization signal 401 and provide a horizontal synchronization signal in a predetermined period without any pausing interval until the next vertical synchronization signal 402 is provided.

The touch sensor IC 253 according to various embodiments, may acquire information about an input position on the touch sensor 251. In the disclosure, the expression that the touch sensor IC 253 senses an input position may signify that the touch sensor IC 253 measures mutual capacitance (or a change therein) between at least one electrode and another electrode, which are included in the touch sensor 251. For example, the touch sensor IC 253 may provide a signal to at least one transmission electrode (TX electrode) included in the touch sensor 251, and may measure a signal received from at least one reception electrode (RX electrode). The touch sensor IC 253 may process the measurement result to acquire information about an input position on the touch sensor IC 253. The above-described method for measuring mutual capacitance is merely an example, and a mutual capacitance measurement method is not limited thereto. Alternatively, sensing an input position by the touch sensor IC 253 may refer to sensing, by the touch sensor IC 253, self-capacitance (or a change therein) of at least one electrode included in the touch sensor 251. The touch sensor IC 253 may provide a signal to at least one electrode included in the touch sensor 251 and identify an electric charge stored in a capacitor corresponding to the electrode, thereby measuring self-capacitance of the at least one electrode. The above-described method for measuring self-capacitance is merely an example, and a mutual capacitance measurement method is not limited thereto.

The touch sensor IC 253 according to various embodiments may be configured to sense an input position while avoiding the time at which horizontal line update is perform. For example, the touch sensor IC 253 may configure the timing of provision of signals 431, 432, 433, 434, 435, 439, 440, 441, and 442 provided to at least one electrode included in the touch sensor 251 such that there is a predetermined time interval Δt between the timing of provision of signals 431, 432, 433, 434, 435, 439, 440, 441, and 442 and the timing of provision of a corresponding signal among horizontal synchronization signals 411, 412, 413, 414, 415, 416, 417, 418, and 419. The signals 431, 432, 433, 434, 435, 439, 440, 441, and 442 provided to the at least one electrode included in the touch sensor 251 may be, for example, signals for measuring mutual capacitance related to the at least one electrode. For example, the touch sensor IC 253 may configure the timing of provision of the signals 431, 432, 433, 434, 435, 439, 440, 441, and 442 for measuring mutual capacitance such that the timing of provision does not overlap horizontal line update timing (or an overlapping time is equal to or shorter than a designated time). For example, the touch sensor IC 253 may configure the provision period of the signal 431, 432, 433, 434, 435, 439, 440, 441, and 442 so as to be equal to the provision period of the horizontal synchronization signals. The touch sensor IC 253 may synchronize timing of provision of a signal to an electrode with timing of provision of a display driving signal, wherein the synchronization may signify, for example, that the period of a horizontal synchronization signal and the period of provision of the signal to the electrode are identically configured and thus there is a preconfigured time interval (Δt) between the timings of provision. The synchronization of a time period of mutual capacitance measurement with a display driving signal is merely an example. According to various embodiments, a time period of self-capacitance measurement and a display driving signal may be configured to be synchronized with each other. As described above, input position measurement refers to provision of a signal to an electrode and reception of a signal from electrode, and thus each of the signals 431, 432, 433, 434, 435, 439, 440, 441, and 442 may be called a time period of input position measurement according to circumstances.

According to various embodiments, referring to FIG. 4, the touch sensor IC 253 may provide signals 436, 437, and 438 even during a pausing interval during which no horizontal synchronization signal is provided. The touch sensor IC 253 may acquire information about an input position, based on the provision of signals and a signal output from at least one electrode. When measurement of all nodes is completed, input position information of one frame may be acquired. The touch sensor IC 253 may acquire input position information of n frames between, for example, the vertical synchronization signals 401 and 402, and the number of times of input position measurement is not limited and may be changed. The number of times of input position measurement will be described later.

Figure 5:
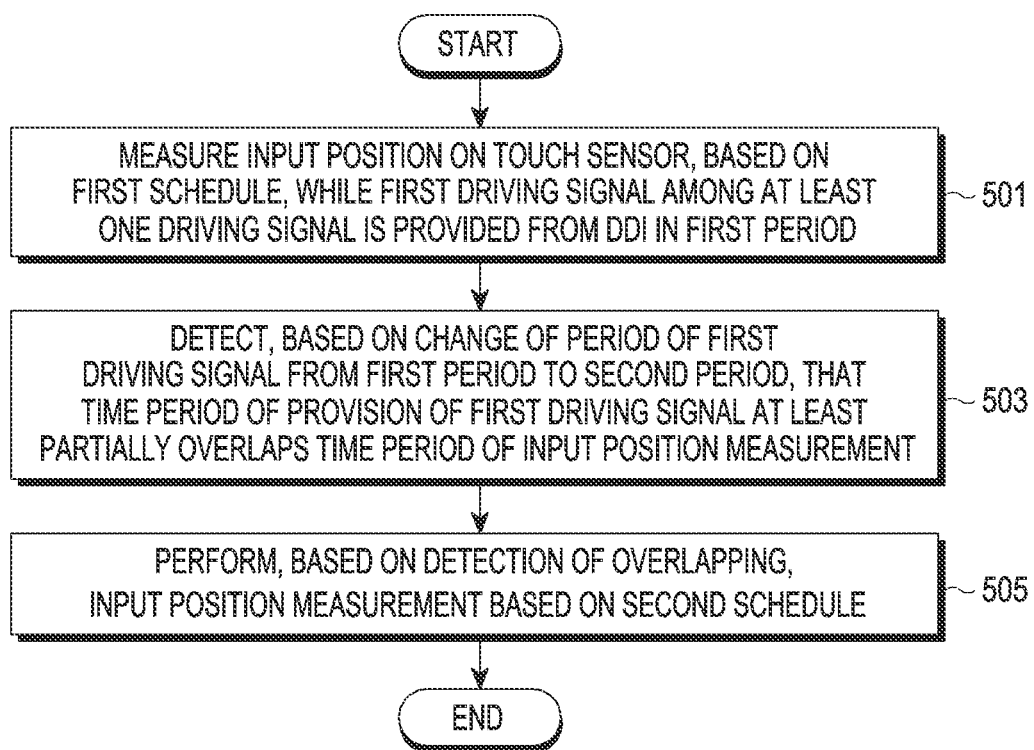
FIG. 5 is a flowchart for describing an operation method of an electronic device according to an embodiment of the disclosure.

FIG. 5 is a flowchart for describing an operation method of an electronic device according to an embodiment of the disclosure.

Referring to FIG. 5, in operation 501, the electronic device 101 (e.g., the touch sensor IC 253) may measure, based on a first schedule, an input position on the touch sensor 251 while a first driving signal (e.g., a vertical synchronization signal) among at least one driving signal is provided from the DDI 230 in a first period. A schedule for input position measurement may include at least one parameter for the input position measurement. For example, the schedule for input position measurement may include the number of times of input position measurement during a time interval between two or more vertical synchronization signals (e.g., the number of frames of input position measurement). For example, the number of times of input position measurement may include the number of times of measurement of self-capacitance and/or the number of times of measurement of mutual capacitance. The number of times of measurement of self-capacitance may refer to the number of times of measurement of self-capacitance of all preconfigured electrodes. The number of times of measurement of mutual capacitance may refer to the number of times of measurement of sensitivity of all preconfigured nodes (e.g., a value derived based on mutual capacitance). The number of times of measurement may be expressed as measurement time. The number of times of measurement of self-capacitance and/or the number of times of measurement of mutual capacitance may be set to zero (0) as necessary. For example, the schedule for input position measurement may include whether input position measurement is synchronized with a driving signal. The electronic device 101 may configure a schedule for input position measurement, based on at least one of, for example, a current operation mode, the period of a display driving signal, or whether a time period of provision of a display driving signal overlaps a time period of input position measurement.

According to various embodiments, in operation 503, the electronic device 101 (e.g., the touch sensor IC 253) may detect, based on a change of the period (e.g., interval) of the first driving signal (e.g., a vertical synchronization signal) from the first period to a second period (e.g., second interval), that the time period of provision of the first driving signal (e.g., the vertical synchronization signal) at least partially overlaps the time period of input position measurement. In the disclosure, the overlapping of two time-periods may signify that the two time-periods at least partially overlap each other or that the difference between the expiry of one time-period and the start of the other time period is equal to or less than a threshold value. In operation 505, the electronic device 101 may perform, based on the detection of overlapping (or the detection of an event related to overlapping), input position measurement based on a second schedule. In various embodiments, instead of directly detecting the overlapping of a time period of measurement, the electronic device 101 may configure a period or point of time of provision such that subsequent overlapping does not occur. For example, before overlapping occurs, the electronic device 101 may change a schedule in expectation of the occurrence of the overlapping, and this may be performed by calculation. Alternatively, the electronic device 101 may be configured to: pre-store a schedule corresponding to a designated frequency (e.g., 60 Hz, 70 Hz, 80 Hz, 90 Hz, 100 Hz, 110 Hz, or 120 Hz); and, when the designated frequency is identified, perform the schedule corresponding thereto. Those skilled in the art will understand that "detection of overlapping" used in the disclosure includes the direct detection of overlapping, the prediction of overlapping, and the detection of a frequency designated for a schedule change. At least one of the direct detection of overlapping, the prediction of overlapping, or the detection of a frequency designated for a schedule change may be called an event related to time period overlapping. Those skilled in the art will understand that the detection of overlapping in operation 503 or the detection of overlapping expressed in the disclosure may be replaced with the detection of the event related to the detection of overlapping. The electronic device 101 may change at least one parameter of a schedule for input position measurement. In another embodiment, the electronic device 101 may change the schedule for input position measurement when a time period of provision of a second driving signal (e.g., a horizontal synchronization signal) at least partially overlaps a time period of input position measurement. Examples in which the electronic device 101 changes the schedule for input position measurement will be described later. When the period of provision of a display driving signal is changed but the schedule for input position measurement is not changed, a time period of provision of the display driving signal may overlap a time period of input position measurement, and thus noise may be generated. When the period of provision of the display driving signal is changed, the electronic device 101 according to various embodiments may change the schedule for input position measurement to reduce the generation of noise.

Figure 6:
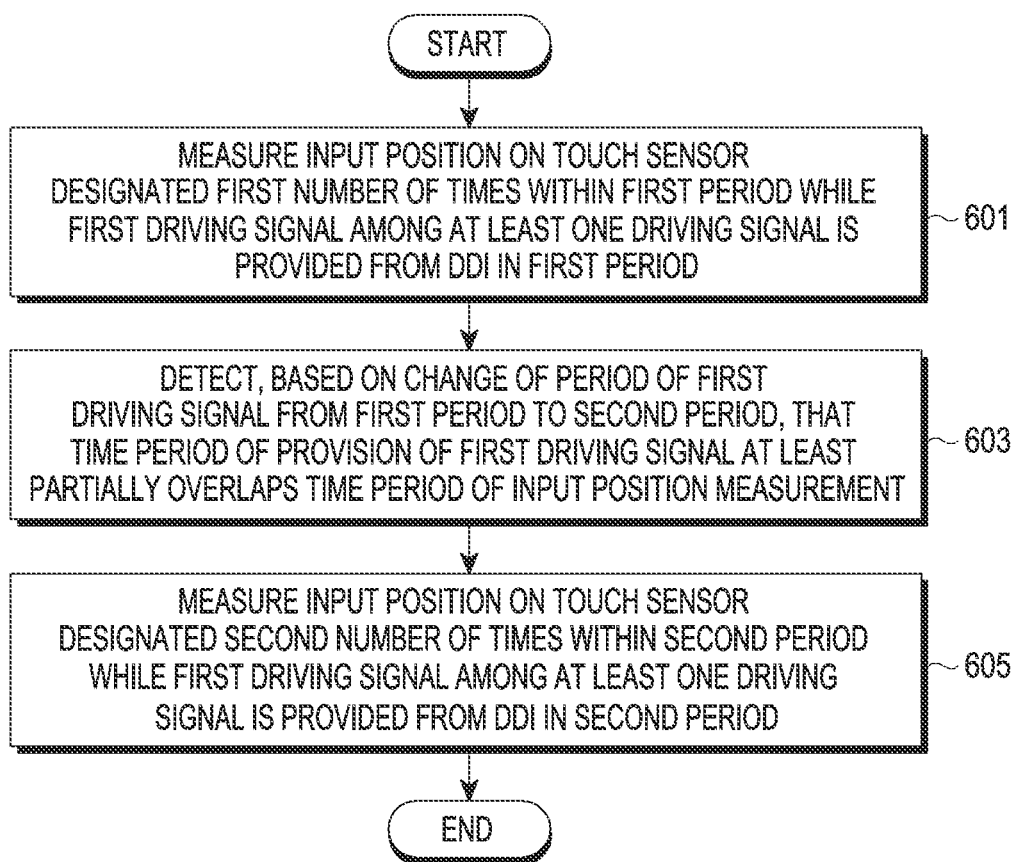
FIG. 6 is a flowchart for describing an operation method of an electronic device according to an embodiment of the disclosure.

FIG. 6 is a flowchart for describing an operation method of an electronic device according to an embodiment of the disclosure. The embodiment in FIG. 6 will be described with reference to FIG. 7.

Figure 7:
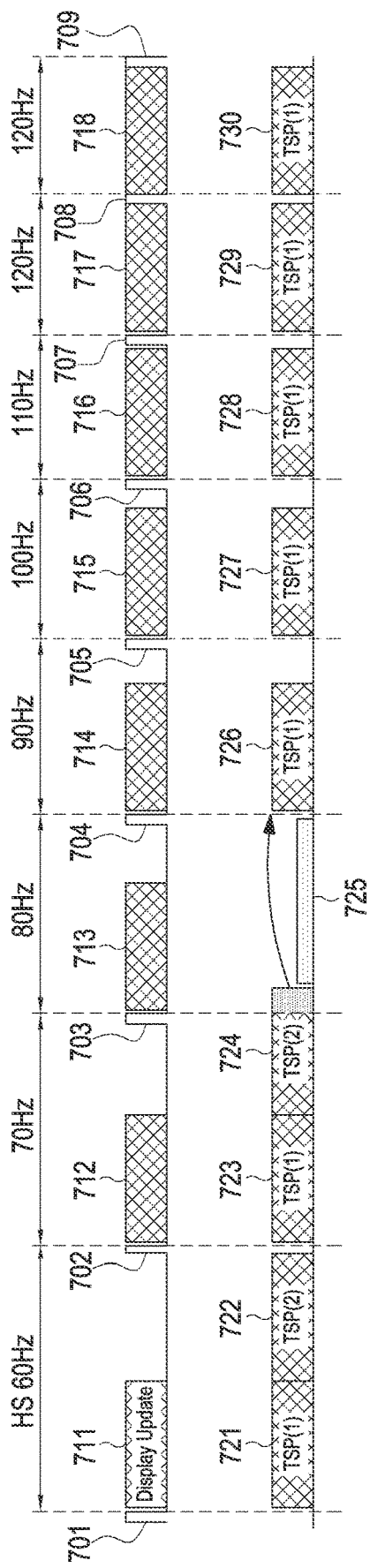
FIG. 7 is a view for describing a schedule for input position measurement according to an embodiment of the disclosure.

FIG. 7 is a view for describing a schedule for input position measurement according to an embodiment of the disclosure.

Referring to FIG. 6, in operation 601, while a first driving signal (e.g., a vertical synchronization signal) among at least one driving signal is provided from the DDI 230 in a first period, the electronic device 101 (e.g., the touch sensor IC 253) may measure an input position on the touch sensor 251 a designated first number of times within the first period. For example, referring to FIG. 7, the DDI 230 may provide vertical synchronization signals 701 and 702 in the first period (e.g., 1/(60 Hz)s). The DDI 230 may perform a display update 711 in a high-speed (HS) mode after the vertical synchronization signal 701 is provided. For example, in a normal mode, at a vertical synchronization signal frequency of 60 Hz, the scan speed of Hsync corresponds to 60 Hz, and thus a display update may be performed without any particular pausing interval until a next vertical synchronization signal is received. In the HS mode, at the vertical synchronization signal of 60 Hz, the scan speed of Hsync corresponds to a frequency (e.g., 120 Hz) higher than 60 Hz and thus a display update may be performed at a relatively early timing, and then a pausing interval may be maintained until the next vertical synchronization signal is received. During the display update 711, the DDI 230 may provide, to the display 210, at least one among a horizontal synchronization signal, data for expressing an image frame, and at least one control signal. When the vertical synchronization signals 701 and 702 are provided in the first period (e.g., 1/(60 Hz)s), the touch sensor IC 253 may perform a first number of input position measurements 721 and 722 (e.g., two input position measurements). Performing input position measurement a first number of times, for example, may refer to acquiring input position information of frames, the number of which corresponds to the first number of times. In various embodiments, for example, one input position measurement may include one or more mutual capacitance measurements related to total measurement target electrodes and/or one or more self-capacitance measurements related to total measurement target electrodes. For example, an input position may be mainly determined based on the result of mutual capacitance measurement, and the result of self-capacitance measurement may be auxiliary used to increase the accuracy of input position determination. Alternatively, in a specific situation (e.g., in a wet mode), the accuracy of the result of mutual capacitance measurement is reduced, and thus various types of information (for example, information regarding whether or not an object exists in proximity) may be determined based on the result of self-capacitance measurement. The wet mode may refer to a mode selected by detection of moisture or a conductor on a touch screen (e.g., cover glass). A time period of the display update 711 may overlap a time period of the input position measurement 721. For example, referring to FIG. 4, the touch sensor IC 253 may synchronize a horizontal synchronization signal with a time period of input position measurement, and may then perform input position measurement.

Referring to FIG. 6, in operation 603, the electronic device 101 (e.g., the touch sensor IC 253) may detect, based on a change of the period of the first driving signal from the first period to a second period, that a time period of provision of the first driving signal at least partially overlaps a time period of input position measurement. For example, referring to FIG. 7, the DDI 230 may change the driving period of a vertical synchronization signal from 1/(60 Hz)s to 1/(120 Hz)s. For example, the electronic device 101 may identify a drag gesture (or a flick gesture) while a scrollable area is displayed, and may determine to scroll the scrollable area. In order to express a natural scroll effect, the electronic device 101 may increase the number of display updates, and thus may be configured to change the driving period of a vertical synchronization signal from 1/(60 Hz)s to 1/(120 Hz). Those skilled in the art will understand that a scroll event is merely an example and the types of events requiring the adjustment of the number of display updates are not limited. The DDI 230 may receive, from the processor 120, a command to change the number of display updates (e.g., information about a vertical synchronization signal), and may change the period of the vertical synchronization signal, based on the received command. When the frequency of a vertical synchronization signal is instantly changed from 60 Hz to 120 Hz, flickering or flashing of a screen may be caused. According to various embodiments, the electronic device 101 may gradually change the frequency of a vertical synchronization signal when changing the frequency from 60 Hz to 120 Hz. For example, referring to FIG. 7, after vertical synchronization signals are provided at time intervals corresponding to 70 Hz, 80 Hz, 90 Hz, 100 Hz, and 110 Hz, a vertical synchronization signal may be provided at a time interval corresponding to 120 Hz. The gradual frequency change may be called a bridge driving method. In addition, a time period of the gradual frequency change may be called a time period of bridge driving. In various embodiments, the DDI 230 may receive information about a frequency (e.g., 60 Hz, 70 Hz, 80 Hz, 90 Hz, 100 Hz, 110 Hz, and 120 Hz) from the processor 120 in real time, and may change a frequency in response thereto. Alternatively, the DDI 230 may be configured to perform frequency adjustment based on mid-range frequencies (70 Hz, 80 Hz, 90 Hz, 100 Hz, 110 Hz) when a destination frequency (e.g., 120 Hz) is received from the processor 120. The gradual frequency change is one embodiment, and the electronic device 101 according to various embodiments may gradually change a frequency, or may instantly change the frequency. Referring to FIG. 7, after the vertical synchronization signal 702 is provided, DDI 230 may provide a vertical synchronization signal 703 in a period of 1/(70 Hz)s. The touch sensor IC 253 may perform input position measurement 723 and 724 based on the vertical synchronization signal 702. The touch sensor IC 253 may receive the vertical synchronization signal 703 from the DDI 230, and may determine that a time period of provision of the vertical synchronization signal 703 overlaps a time period of input position measurement 724. The touch sensor IC 253 may be configured to temporarily stop (725) input position measurement when it is determined that the overlapping occurs.

Referring to FIG. 6, in operation 605, while the first driving signal (e.g., a vertical synchronization signal) among the at least one driving signal is provided from the DDI 230 in a second period, the electronic device 101 (e.g., the touch sensor IC 253) may measure an input position on the touch sensor a designated second number of times within the second period. For example, the electronic device 101 may adjust, based on detection of overlapping, the number of times of input position measurement in a schedule for the input position measurement. Referring to FIG. 7, the electronic device 101 may identify that the time period of the input position measurement 724 overlaps the vertical synchronization signal 703, and then, when a vertical synchronization signal 704 is identified based thereon, may perform input position measurement 726 a second number of times (e.g., once). As the input position measurement 726 is performed the second number of times (e.g., once), input position measurement 726 may be prevented from overlapping the vertical synchronization signal 704. In various embodiments, for example, before the overlapping occurs, both self-capacitance and mutual capacitance may be measured in response to one vertical synchronization signal, and, during a time period of frequency adjustment, in which overlapping has occurred, at least one of self-capacitance or mutual capacitance may be measured in response to one vertical synchronization signal. When the time period of frequency adjustment expires, self-capacitance and mutual capacitance may be all measured, and, for example, may be alternately measured whenever vertical synchronization signals are received.

Referring to FIG. 7, the electronic device 101 (e.g., the touch sensor IC 253) may perform input position measurement 727, 728, 729, and 730 based on corresponding vertical synchronization signals 705, 706, 707, and 708 the second number of times (e.g., once). After a vertical synchronization signal 709, measurement may also be continued. Although not illustrated, when the frequency of a vertical synchronization signal returns to 60 Hz again, the touch sensor IC 253 may again perform input position measurement the first number of times (e.g., twice).

Figure 8:
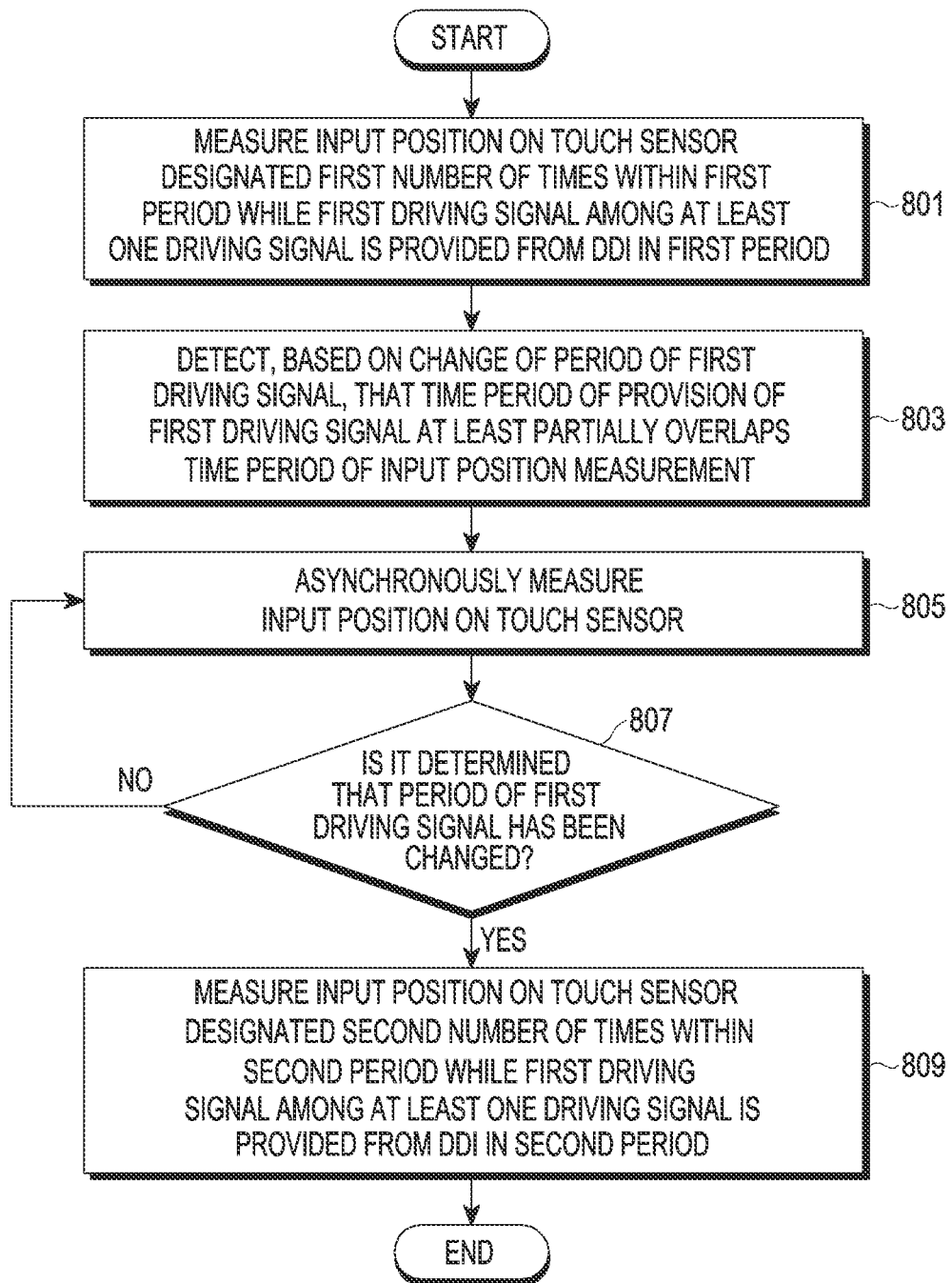
FIG. 8 is a flowchart for describing an operation method of an electronic device according to an embodiment of the disclosure.

FIG. 8 is a flowchart for describing an operation method of an electronic device according to an embodiment of the disclosure. The embodiment in FIG. 8 will be described with reference to FIG. 9.

Figure 9:
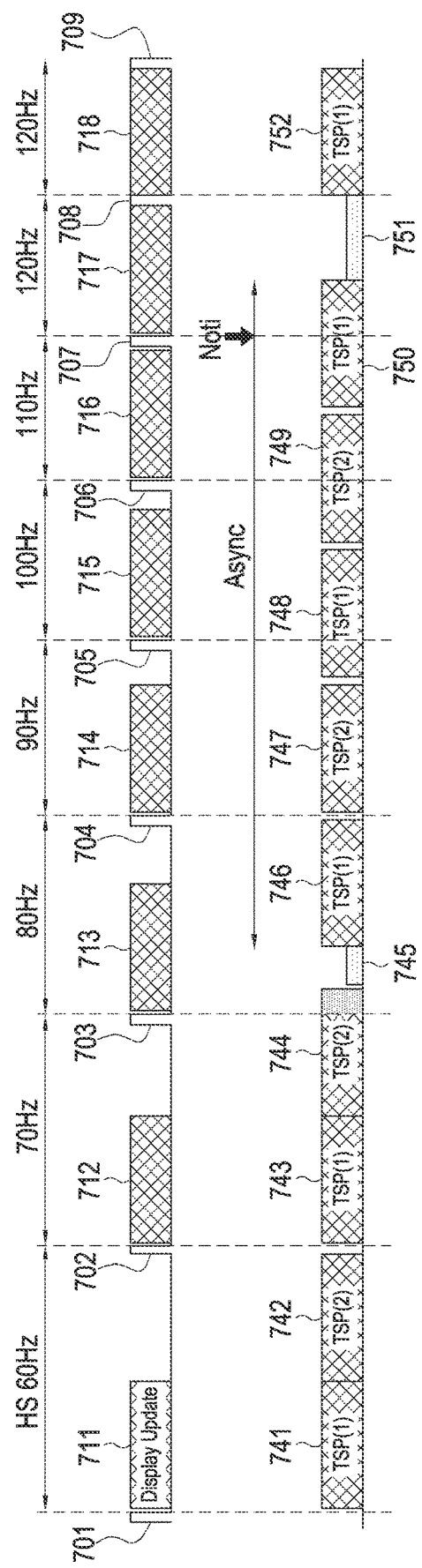
FIG. 9 is a view for describing a schedule for input position measurement according to an embodiment of the disclosure.

FIG. 9 is a view for describing a schedule for input position measurement according to an embodiment of the disclosure.

Referring to FIG. 8, in operation 801, the electronic device 101 (e.g., the touch sensor IC 253) may measure an input position on the touch sensor 251 a designated first number of times within a first period while a first driving signal (e.g., a vertical synchronization signal) among at least one driving signal is provided from the DDI 230 in the first period. For example, referring to FIG. 9, the DDI 230 may provide vertical synchronization signals 701 and 702 in the first period (e.g., 1/(60 Hz)s). The DDI 230 may perform a display update 711 in a high-speed (HS) mode after the vertical synchronization signal 701 is provided. When the vertical synchronization signals 701 and 702 are provided in the first period (e.g., 1/(60 Hz)s), the touch sensor IC 253 may perform input position measurement a first number of times (e.g., twice) (input position measurement 741 and input position measurement 742).

Referring to FIG. 8, in operation 803, the electronic device 101 (e.g., the touch sensor IC 253) may detect, based on a change of the period of the first driving signal from the first period to a second period, that a time period of provision of the first driving signal at least partially overlaps a time period of input position measurement. For example, referring to FIG. 9, the DDI 230 may change the driving period of a vertical synchronization signal from 1/(60 Hz)s to 1/(70 Hz)s. The touch sensor IC 253 may perform input position measurement 743 and 744 based on the vertical synchronization signal 702. The touch sensor IC 253 may receive a vertical synchronization signal 703 from the DDI 230, and may determine that the vertical synchronization signal 703 overlaps a time period of the input position measurement 744. When it is determined that the overlapping occurs, the touch sensor IC 253 may be configured to temporarily stop (745) input position measurement.

According to various embodiments, electronic device 101 (e.g., the touch sensor IC 253) may asynchronously perform input position measurement in operation 805. For example, referring to FIG. 9, the electronic device 101 may perform input position measurement 746, 747, 748, 749, and 750, independently of vertical synchronization signals 704, 705, 706, and 707. In operation 807, the touch sensor IC 253 may determine whether the period of the first driving signal has been changed. The electronic device 101 may be configured to perform a schedule corresponding to a designated frequency without directly determining whether the period of the first driving signal has been changed. When it is determined that the period has not been changed (807-No), the electronic device 101 may asynchronously perform input position measurement. When it is determined that the period has been changed (807-Yes), the electronic device 101 may measure, in operation 809, an input position on the touch sensor 251 a designated second number of times within the second period while the first driving signal (e.g., vertical synchronization signal) among the at least one driving signal is provided from the DDI 230 in the second period. For example, as illustrated in FIG. 9, the touch sensor IC 253 may receive a notification (Noti), by which it can be determined that the period has been changed, from the processor 120 and/or the DDI 230. The touch sensor IC 253 may be configured to temporarily stop ( 751) input position measurement when the notification (Noti) is received. Thereafter, when a vertical synchronization signal 708 is identified, the touch sensor IC 253 may perform input position measurement 752 the second number of times (e.g., once) designated within the second period (e.g., 1/(120 Hz)s). According to various embodiments, the touch sensor IC 253 may be configured to adjust the number of times of measurement, based on the fact that a vertical synchronization signal is received at a designated time (e.g., 1/(120 Hz)s) after a precedent vertical synchronization signal is received, without receiving a separate notification (Noti).

According to various embodiments, the electronic device 101 may alternately measure self-capacitance and mutual capacitance or may measure only specific capacitance, after a pausing interval during asynchronous input measurement.

Although not illustrated, according to various embodiments, the DDI 230 may also instantly change the period of a vertical synchronization signal from 1/(60 Hz)s to 1/(120 Hz)s. For example, the touch sensor IC 253 may determine that a vertical synchronization signal overlaps a time period of input position measurement, and may adjust, based thereon, the number of times of input position measurement. Alternatively, for example, the touch sensor IC 253 may acquire information about a period change from the DDI 230 and/or the processor 120, and may also adjust the number of times of input position measurement according to a changed period. Table 1 shows an example of information about a relationship between a vertical synchronization signal and the number of times of input position measurement. The vertical synchronization signal may have a frequency during a time period of constant-frequency maintenance or a frequency during a time period of frequency adjustment.

TABLE 1

| Frequency of vertical synchronization signal | Number of times of input position measurement |
| --- | --- |
| F1 | N1 |
| F2 | N2 |
| F3 | N3 |

The touch sensor IC 253 may determine the number of times of input position measurement, based on frequency information received from the processor 120 and/or the DDI 230 and the relationship information in Table 1. For example, the processor 120 may determine, based on at least one of a currently running application or user input, the frequency of a vertical synchronization signal, and may transfer the determined frequency to the DDI 230 and/or the touch sensor IC 253.

As described above, the electronic device 101 may also adjust, based on detection of overlapping, synchronization with a display driving signal in a schedule for input position measurement.

Figure 10:
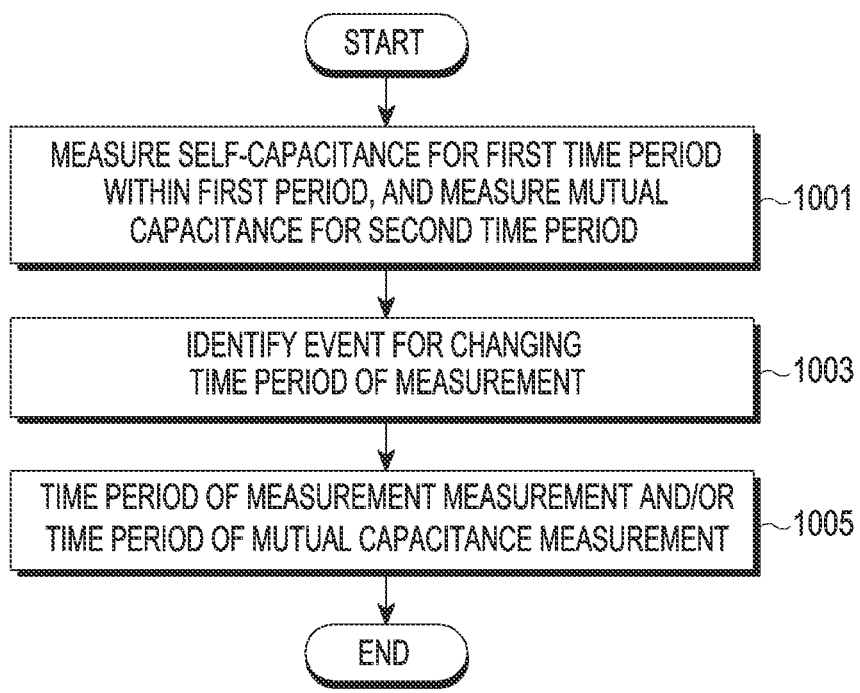
FIG. 10 is a flowchart for describing an operation method of an electronic device according to an embodiment of the disclosure.

FIG. 10 is a flowchart for describing an operation method of an electronic device according to an embodiment of the disclosure. The embodiment in FIG. 10 will be described with reference to FIGS. 11A and 11B.

Figure 11A:
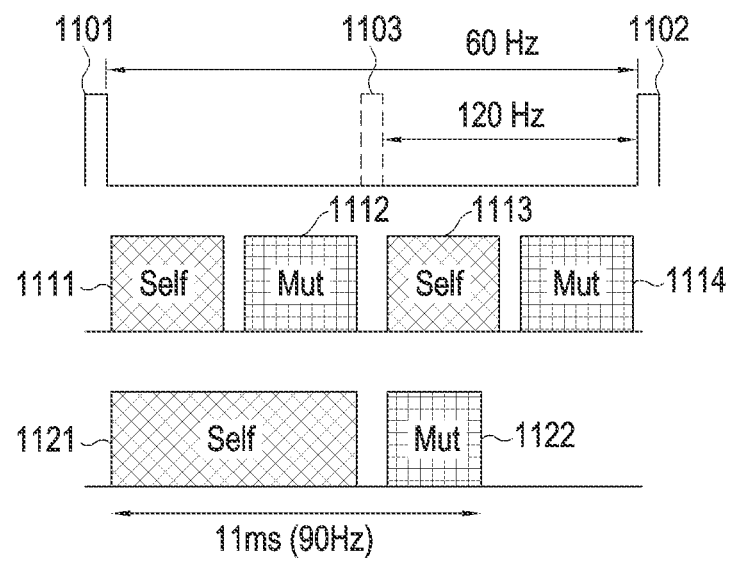
FIG. 11A is a view for describing a schedule for input position measurement according to an embodiment of the disclosure.

FIG. 11A is a view for describing a schedule for input position measurement according to an embodiment of the disclosure.

Figure 11B:
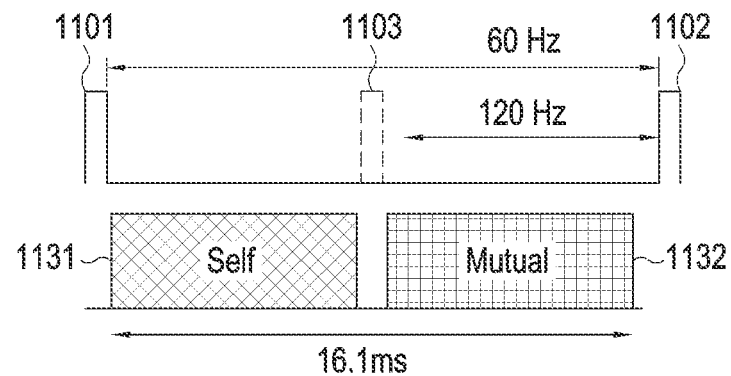
FIG. 11B is a view for describing a schedule for input position measurement according to an embodiment of the disclosure.

FIG. 11B is a view for describing a schedule for input position measurement according to an embodiment of the disclosure.

Referring to FIG. 10, in operation 1001, the electronic device 101 (e.g., the touch sensor IC 253) may measure self-capacitance during a first time period within a first period, and may measure mutual capacitance during a second time period. For example, referring to FIG. 11A, the DDI 230 may provide vertical synchronization signals 1101 and 1102 in the first period (e.g., 1/(60 Hz)s). For example, referring to FIG. 7, the touch sensor IC 253 may perform input position measurement twice (the input position measurement 721 and the input position measurement 722) in a normal mode. According to various embodiments, first input position measurement (e.g., reference numeral 721) may include self-capacitance measurement 1111 and mutual capacitance measurement 1112, and second input position measurement (e.g., reference numeral 722) may include self-capacitance measurement 1113 and mutual capacitance measurement 1114.

Referring to FIG. 10, in operation 1003, the electronic device 101 according to various embodiments may identify an event for changing a time period of measurement. In operation 1005, the electronic device 101 may change, based on the event for changing the time period of measurement, a time period of self-capacitance measurement and/or a time period of mutual capacitance measurement. For example, the event for changing the time period of measurement may refer to an event which causes a change from the normal mode to another mode. Examples of another mode may include a wet-mode and a call-mode, but are not limited thereto.

According to various embodiments, the wet-mode may be a mode corresponding to the case in which humidity is detected from window glass covering the surface (e.g., the display 210) of the electronic device 101. Humidity present on the window glass may affect mutual capacitance between electrodes, thereby reducing the accuracy of position measurement based on the mutual capacitance. In this case, the electronic device 101 may determine an input position by using the result of self-capacitance measurement, or may correct the determined input position, based on the result of mutual capacitance measurement. In the wet-mode, referring to FIG. 11A, a time period of self-capacitance measurement 1121 may be longer than a time period of the self-capacitance measurement 1111 in the normal mode. As the time period of the self-capacitance measurement 1121 increases, a time period of one input position measurement may increase to, for example, 90 ms (e.g., a time period corresponding to 90 Hz) or more. According to various embodiments, in the wet-mode, the electronic device 101 may be configured to perform one measurement 1121 and 1122 in response to one vertical synchronization signal when providing the vertical synchronization signals 1101 and 1102 in the first period (e.g., 1/(60 Hz)s). When the period of a vertical synchronization signal is changed to a second period (e.g., 1/(120 Hz)s), a vertical synchronization signal 1103 may be provided. In order to prevent overlapping with the vertical synchronization signal 1103 according to the second period, the touch sensor IC 253 may maintain a predetermined interval between the time period of the self-capacitance measurement 1121 and a time period of the mutual capacitance measurement 1122. According to various embodiments, when the frequency of a vertical synchronization signal is gradually changed, a time period of measurement may overlap a vertical synchronization signal, and a description thereof will be described later.

According to various embodiments, the call-mode may be a mode corresponding to the case in which a call-application of the electronic device 101 is executed. In the call-mode, a user is likely to bring his/her ear into contact with a surface of the electronic device 101, through which the display 210 is exposed. If the electronic device 101 does not include a proximity sensor, the electronic device 101 may determine, based on the result of measurement by the touch sensor IC 253, whether the user places his/her ear on the display 210. In the call-mode, for example, the shape of an ear may be detected. For accurate detection, in the call-mode, referring to FIG. 11B, a time period of mutual capacitance measurement 1132 may increase compared with that in the normal mode. Alternatively, when the user talks for a long time, the display 210 may be stained with the user's sweat. In this case, as described above, in order to increase the accuracy, a time period of self-capacitance measurement 1131 may increase compared with that in the normal mode. For example, the sum of the time period of the self-capacitance measurement 1131 and the time period of the mutual capacitance measurement 1132 may increase to 16.1 ms or more. In the call-mode, the electronic device 101 may perform one measurement 1131 and 1132 for the first period (e.g., 1/(60 Hz)s). When the period of a vertical synchronization signal is changed to the second period (e.g., 1/(120 Hz)s), a vertical synchronization signal 1103 may be provided. In order to prevent overlapping with the vertical synchronization signal 1103 according to the second period, the touch sensor IC 253 may maintain a predetermined interval between the time period of the self-capacitance measurement 1131 and the time period of mutual capacitance measurement 1132. According to various embodiments, when the frequency of a vertical synchronization signal is gradually changed, a time period of measurement may overlap a vertical synchronization signal, and a description thereof will be described later.

As described above, the electronic device 101 according to various embodiments may change the time period of self-capacitance measurement and/or the time period of mutual capacitance measurement according to a change in mode. Even though the period of a vertical synchronization signal is not changed, the electronic device 101 may adjust the number of times of measurement according to a change in mode. Hereinafter, a description will be made of embodiments in which the period of a vertical synchronization signal is changed in a mode other than the normal mode.

Figure 12:
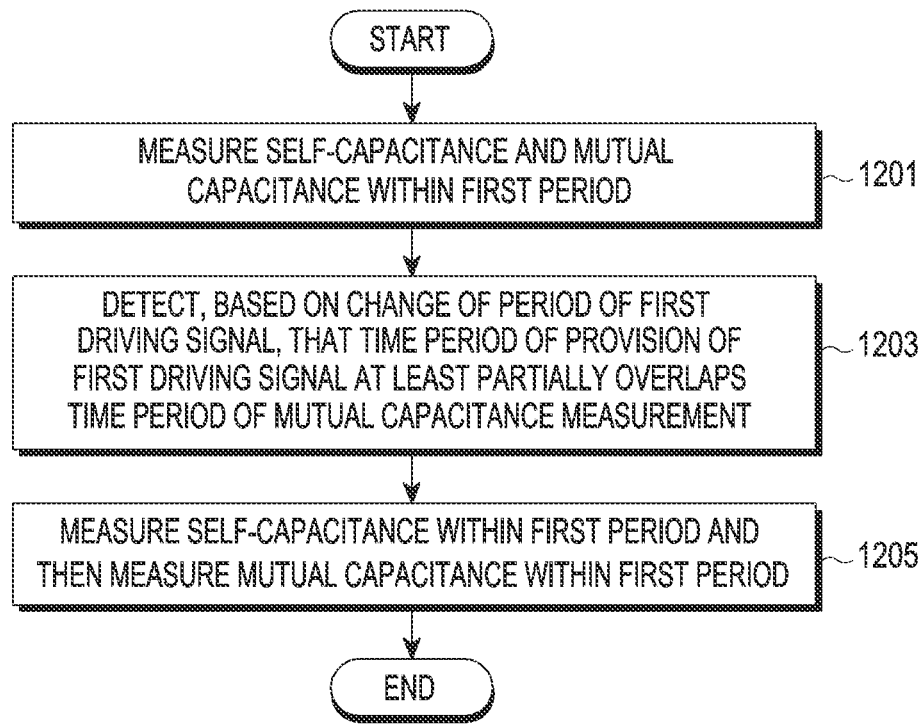
FIG. 12 is a flowchart for describing an operation method of an electronic device according to an embodiment of the disclosure.

FIG. 12 is a flowchart for describing an operation method of an electronic device according to an embodiment of the disclosure. The embodiment in FIG. 12 will be described with reference to FIG. 13.

Figure 13:
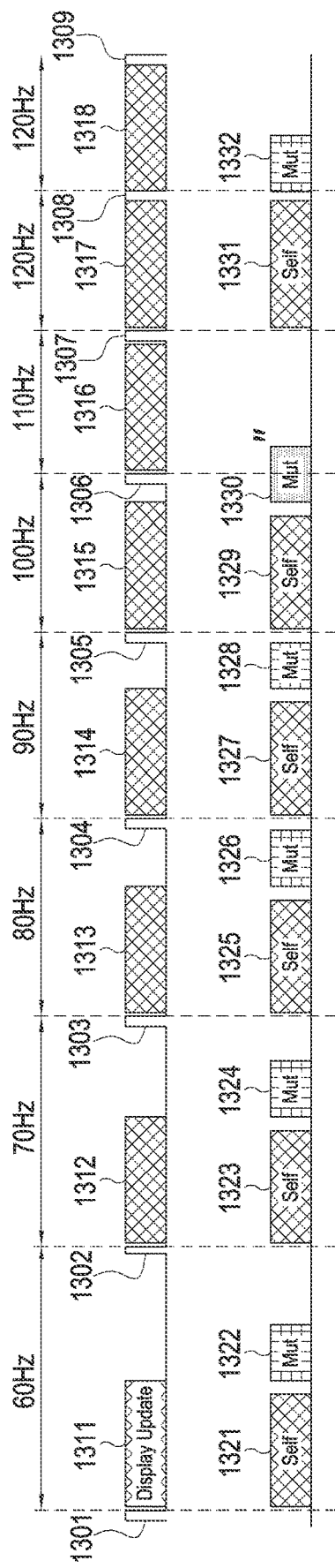
FIG. 13 is a view for describing a schedule for input position measurement according to an embodiment of the disclosure.

FIG. 13 is a view for describing a schedule for input position measurement according to an embodiment of the disclosure.

Referring to FIG. 12, in operation 1201, the electronic device 101 (e.g., the touch sensor IC 253) may measure self-capacitance and mutual capacitance within a first period. Referring to FIG. 13, the electronic device 101 may perform a display update 1311 while vertical synchronization signals 1301 and 1302 are provided for the first period (e.g., 1/(60 Hz)s). The electronic device 101 may be in a wet-mode, and may perform self-capacitance measurement 1321 and mutual capacitance measurement 1322 while the vertical synchronization signals 1301 and 1302 are provided for the first period (e.g., 1/(60 Hz)s).

Referring to FIG. 12, in operation 1203, the electronic device 101 (e.g., the touch sensor IC 253) according to various embodiments may detect, based on a change of the period of a first driving signal, that a time period of provision of the first driving signal at least partially overlaps a time period of measurement. Referring to FIG. 13, the DDI 230 may provide vertical synchronization signals 1303, 1304, 1305, 1306, 1307, and 1308 at time intervals of 1/(70 Hz)s, 1/(80 Hz)s, 1/(90 Hz)s, 1/(100 Hz)s, 1/(110 Hz)s, and 1/(120 Hz)s, respectively. Thereafter, the DDI 230 may provide a vertical synchronization signal 1309 in a period of 1/(120 Hz)s. The DDI 230 may perform display updates 1312, 1313, 1314, 1315, 1316, 1317, and 1318. For example, the touch sensor IC 253 may determine that the vertical synchronization signals 1301, 1302, 1303, 1304, and 1305 do not overlap time periods of measurements 1321, 1322, 1323, 1324, 1325, 1326, 1327, 1328, and 1329. The touch sensor IC 253 may determine that a vertical synchronization signal 1306 overlaps a time period of measurement 1330.

Referring to FIG. 12, in operation 1205, the electronic device 101 (e.g., the touch sensor IC 253) according to various embodiments may measure self-capacitance within the first period, and may measure mutual capacitance within the next first period. When a vertical synchronization signal is provided, the touch sensor IC 253 may alternately perform self-capacitance measurement and mutual capacitance measurement. For example, referring to FIG. 13, the touch sensor IC 253 may temporarily stop measurement, based on the fact that the vertical synchronization signal 1306 overlaps the time period of measurement 1330. The touch sensor IC 253 may perform self-capacitance measurement 1331, based on the provision of a vertical synchronization signal 1307. After performing the self-capacitance measurement 1331, the touch sensor IC 253 may perform mutual capacitance measurement 1332, based on the provision of a vertical synchronization signal 1308. Although not illustrated, after performing the mutual capacitance measurement 1332, the touch sensor IC 253 may perform self-capacitance measurement (not shown), based on the provision of a vertical synchronization signal 1309.

Figure 14:
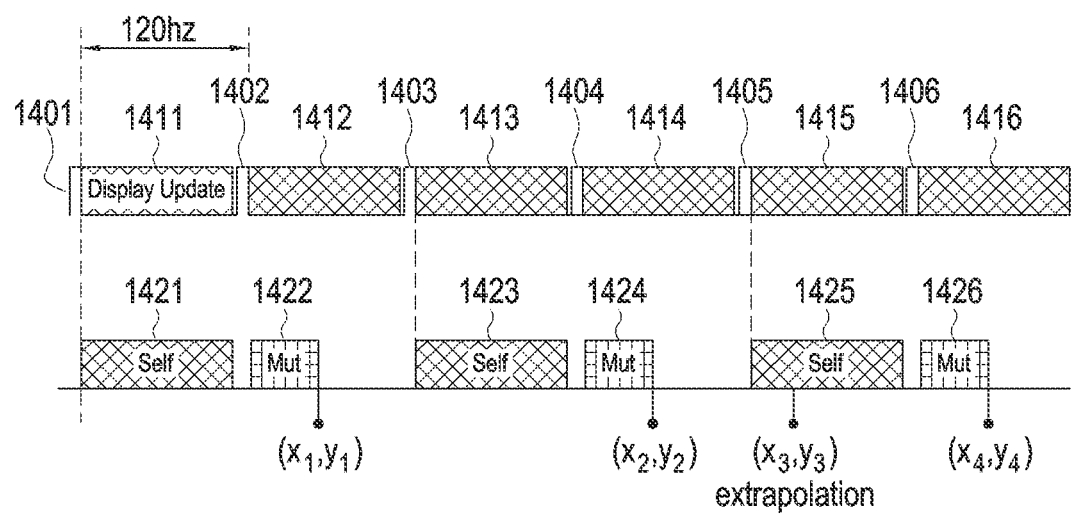
FIG. 14 is a view for describing a schedule for input position measurement according to an embodiment of the disclosure.

FIG. 14 is a view for describing a schedule for input position measurement according to an embodiment of the disclosure.

According to various embodiments, for example, as illustrated in FIG. 13, the electronic device 101 (e.g., the DDI 230) may change the period of a vertical synchronization signal to 1/(120 Hz)s, and may maintain the changed period.

Referring to FIG. 14, the DDI 230 may provide vertical synchronization signals 1401, 1402, 1403, 1404, 1405, and 1406 in a period of 1/(120 Hz)s. The DDI 230 may perform display updates 1411, 1412, 1413, 1414, 1415, and 1416 based on vertical synchronization signals 1401, 1402, 1403, 1404, 1405, and 1406. As described above, the touch sensor IC 253 may alternately perform self-capacitance measurements 1421, 1423, and 1425 and mutual capacitance measurements 1422, 1424, and 1426.

The touch sensor IC 253 may determine information about a first input position (e.g., first coordinates (x1, y1)), based on the result of self-capacitance measurement 1421 and the result of mutual capacitance measurement 1422, and may transfer the information to the processor 120. The touch sensor IC 253 may determine information about a second input position (e.g., second coordinates (x2, y2)), based on the result of self-capacitance measurement 1423 and the result of mutual capacitance measurement 1424, and may transfer the information to the processor 120. Even though a display update 1411 is performed at a frequency of 120 Hz for example, information about an input position may be measured at a frequency 60 Hz, and thus touch responsiveness may also be reduced. The touch sensor IC 253 and/or the processor 120 may determine, based on information about at least two pre-identified input positions (e.g., the first coordinates (x1, y1) and the second coordinates (x2, y2)), information about a third input position (e.g., third coordinates (x3, y3)). For example, the touch sensor IC 253 and/or the processor 120 may determine the third coordinates (x3, y3) by extrapolating the first coordinates (x1, y1) and the second coordinates (x2, y2), but a method for determining the third coordinates (x3, y3) is not limited. In various embodiments, when performing extrapolation or interpolation, the electronic device 101 may also use additional coordinates other than the first coordinates (x1, y1) and the second coordinates (x2, y2).

According to various embodiments, the touch sensor IC 253 may determine information about a fourth input position (e.g., fourth coordinates (x4, y4)), based on the result of self-capacitance measurement 1425 and the result of mutual capacitance measurement 1426. Although not illustrated, the touch sensor IC 253 and/or the processor 120 may determine fifth coordinates (x5, y5), based on the third coordinates (x3, y3) and the fourth coordinates (x4, y4). Through the above described process, the electronic device 101 may acquire information about an input position at a frequency of 120 Hz, and may prevent the reduction of touch sensitivity.

Figure 15:
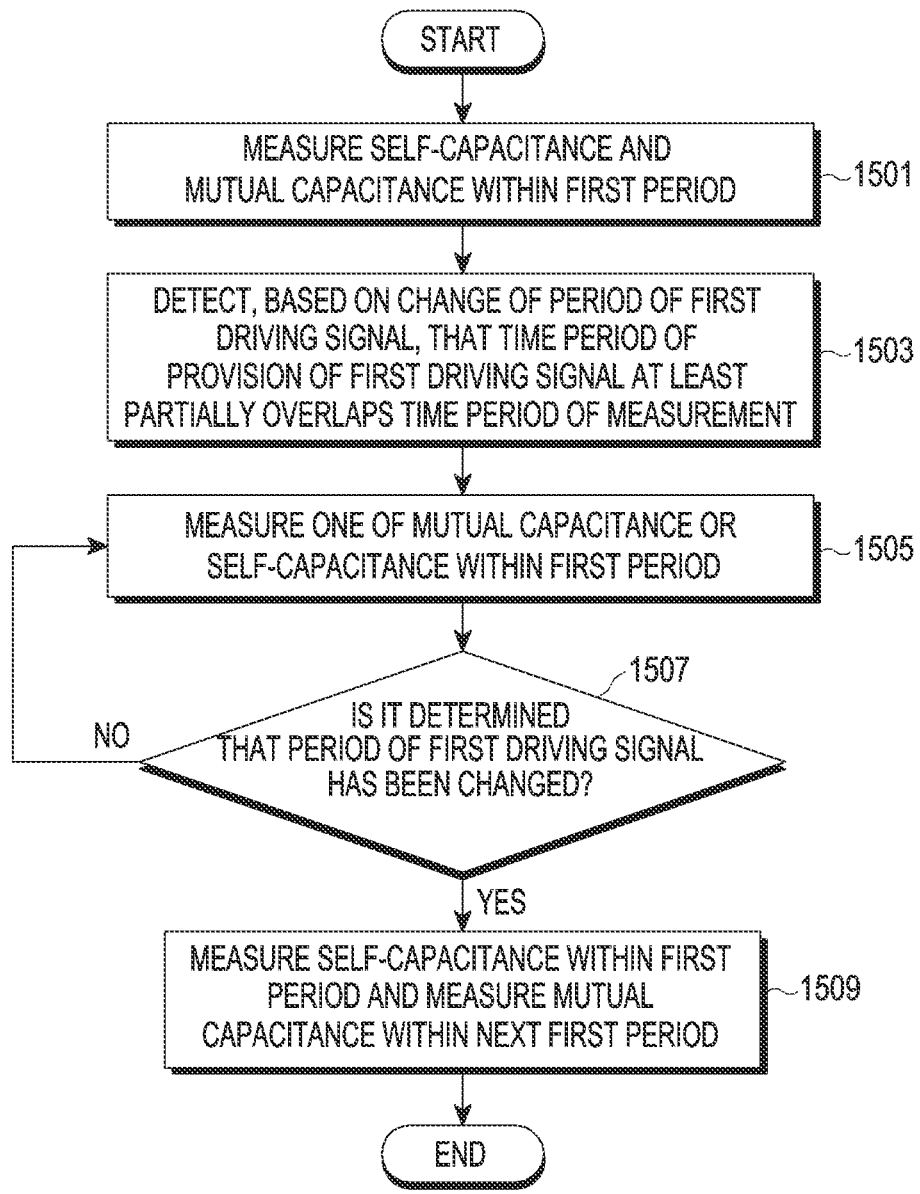
FIG. 15 is a flowchart for describing an operation method of an electronic device according to an embodiment of the disclosure.

FIG. 15 is a flowchart for describing an operation method of an electronic device according to an embodiment of the disclosure. The embodiment in FIG. 15 will be described with reference to FIG. 16.

Figure 16:
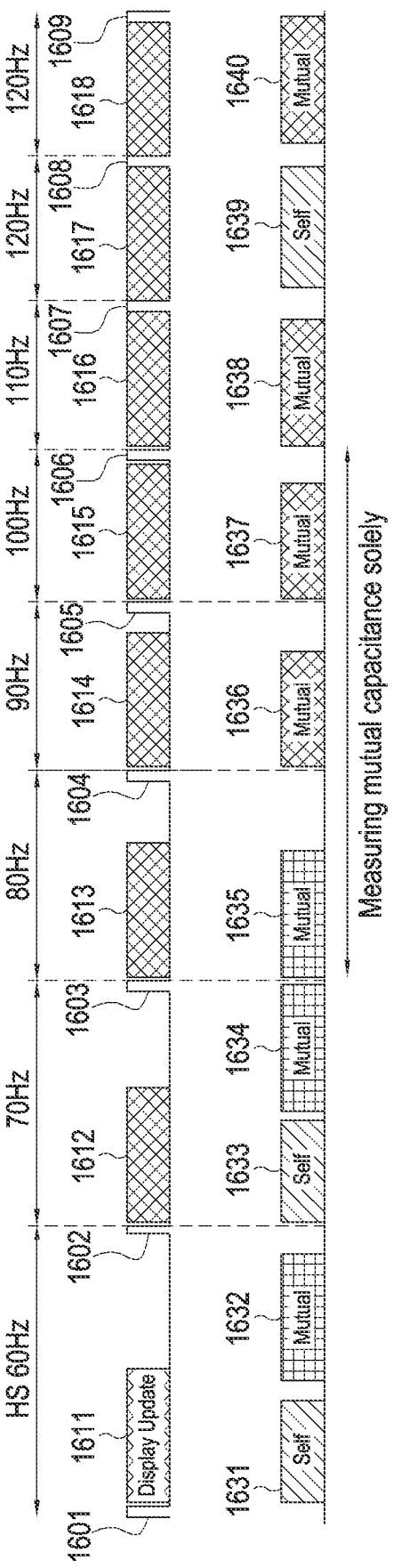
FIG. 16 is a view for describing a schedule for input position measurement according to an embodiment of the disclosure.

FIG. 16 is a view for describing a schedule for input position measurement according to an embodiment of the disclosure.

Referring to FIG. 15, in operation 1501, the electronic device 101 (e.g., the touch sensor IC 253) may measure self-capacitance and mutual capacitance within a first period. Referring to FIG. 16, the electronic device 101 may perform a display update 1611 while vertical synchronization signals 1601 and 1602 are provided for the first period (e.g., 1/(60 Hz)s). The electronic device 101 may be in a call-mode, and may perform self-capacitance measurement 1621 and mutual capacitance measurement 1622 while the vertical synchronization signals 1601 and 1602 are provided for the first period (e.g., 1/(60 Hz)s).

Referring to FIG. 15, in operation 1503, the electronic device 101 (e.g., the touch sensor IC 253) according to various embodiments may detect, based on a change in the period of a first driving signal, that a time period of provision of the first driving signal at least partially overlaps a time period of measurement. Referring to FIG. 16, the DDI 230 may provide vertical synchronization signals 1603, 1604, 1605, 1606, 1607, and 1608 at time intervals of 1/(70 Hz)s, 1/(80 Hz)s, 1/(90 Hz)s, 1/(100 Hz)s, 1/(110 Hz)s, and 1/(120 Hz)s, respectively. Thereafter, the DDI 230 may provide a vertical synchronization signal 1609 in a period of 1/(120 Hz)s. The DDI 230 may perform display updates 1612, 1613, 1614, 1615, 1616, 1617, and 1618. For example, the touch sensor IC 253 may determine that the vertical synchronization signals 1601 and 1602 do not overlap time periods of measurements 1631, 1632, and 1633. The touch sensor IC 253 may determine that a vertical synchronization signal 1603 overlaps a time period of measurement 1634.

Referring to FIG. 15, in operation 1505, the electronic device 101 (e.g., the touch sensor IC 253) according to various embodiments may measure one of mutual capacitance or self-capacitance within the first period. Referring to FIG. 16, the touch sensor IC 253 may perform mutual capacitance measurements 1635, 1636, 1637, and 1638. In operation 1507, the touch sensor IC 253 may determine whether the period of the first driving signal has been changed. When it is determined that the period of the first driving signal has not been changed (1507-No), the electronic device 101 may maintain the measurement of one of mutual capacitance or self-capacitance. When it is determined that the period of the first driving signal has been changed (1507-Yes), in operation 1509, the touch sensor IC 253 may measure self-capacitance within the first period and measure mutual capacitance within the next first period. For example, the touch sensor IC 253 may alternately perform self-capacitance measurement 1639 and mutual capacitance measurement 1640.

According to various embodiments, the electronic device 101 may include: a touch sensor (e.g., the touch sensor 251); a touch sensor IC (e.g., the touch sensor IC 253) configured to identify an input position on the touch sensor (e.g., the touch sensor 251); a display (e.g., the display 210); and a display driving IC (e.g., the DDI 230) configured to provide, to the display (e.g., the display 210), at least one driving signal for driving the display (e.g., the display 210), wherein the touch sensor IC (e.g., the touch sensor IC 253) is configured to: measure, based on a first schedule, the input position on the touch sensor (e.g., the touch sensor 251) while a first driving signal among the at least one driving signal is provided from the display driving IC (e.g., the DDI 230) in a first interval, the first schedule being configured such that the at least one driving signal does not overlap a time period of the measurement of the input position; detect, based on a change of an interval of the first driving signal from the first interval to a second interval, an event in which a time period of the first driving signal being provided at least partially overlaps the time period of the measurement of the input position; and based on detecting the event, measure the input position, based on a second schedule which is different from the first schedule.

According to various embodiments, the touch sensor IC (e.g., the touch sensor IC 253) may be configured to: measure the input position a first number of times within a time period of the first interval as at least a part of the measuring of the input position on the touch sensor (e.g., the touch sensor 251) based on the first schedule while the first driving signal is provided in the first interval; and measure the input position a second number of times, which is different from the first number of times, within a time period of the second interval as at least a part of the measuring of the input position based on the second schedule, while the first driving signal is provided in the second interval.

According to various embodiments, the touch sensor IC (e.g., the touch sensor IC 253) may be configured to, as at least a part of the measuring of the input position based on the second schedule different from the first schedule, measure, based on reception of a first driving signal following one of first driving signals, the input position the second number of times within the time period of the second interval when detecting an event in which a time period of the one of the first driving signals being provided at least partially overlaps the time period of the measurement of the input position.

According to various embodiments, the touch sensor IC (e.g., the touch sensor IC 253) may be configured to, as at least a part of the measuring of the input position based on the second schedule, measure the input position independently of the first driving signal after at least a part of a time period of one of first driving signals being provided has elapsed when detecting an event in which the at least part of the time period of the one of the first driving signals being provided overlaps the time period of the measurement of the input position.

According to various embodiments, the touch sensor IC (e.g., the touch sensor IC 253) may be configured to, when it is identified that the interval of the first driving signal has been changed while the input position is measured independently of the first driving signal, measure the input position a second number of times, which is different from the first number of times, within a time period of the interval in which the change is completed.

According to various embodiments, the touch sensor IC (e.g., the touch sensor IC 253) may be further configured to identify that the interval of the first driving signal has been changed, based on receiving a notification indicating that the interval of the first driving signal has been changed or on identifying that a time interval between two first driving signals is a predesignated time interval.

According to various embodiments, the touch sensor IC (e.g., the touch sensor IC 253) may be configured to measure the input position a first number of times within a time period of the first interval as at least a part of the measuring of the input position on the touch sensor (e.g., the touch sensor 251) based on the first schedule while the first driving signal is provided in the first interval, the measuring of the input position including measuring the mutual capacitance of at least one pair of multiple electrodes included in the touch sensor (e.g., the touch sensor 251) and the self-capacitance of at least one of the multiple electrodes.

According to various embodiments, the touch sensor IC (e.g., the touch sensor IC 253) may be further configured to change a time period of at least one of the measurement of the self-capacitance or the measurement of the mutual capacitance when an event for changing the time period of the at least one of the measurement of the self-capacitance or the measurement of the mutual capacitance is detected.

According to various embodiments, the touch sensor IC (e.g., the touch sensor IC 253) may be configured to measure the input position a second number of times, which is different from the first number of times, within a time period of the second interval, based on the changing of the time period of the at least one of the measurement of the self-capacitance or the measurement of the mutual capacitance.

According to various embodiments, the touch sensor IC (e.g., the touch sensor IC 253) may be configured to, as at least a part of the measuring of the input position based on the second schedule, alternately measure the self-capacitance and the mutual capacitance in response to each of two continuous first driving signals.

According to various embodiments, the touch sensor IC (e.g., the touch sensor IC 253) may be further configured to calculate the input position, based on information about at least two pre-identified input positions, while alternately measuring the self-capacitance and the mutual capacitance.

According to various embodiments, the touch sensor IC (e.g., the touch sensor IC 253) may be configured to, as at least a part of the measuring of the input position based on the second schedule, perform one of the measurement of the self-capacitance and the measurement of the mutual capacitance in the second interval at a bridge driving interval at which an interval of the first driving signal is changed.

According to various embodiments, the touch sensor IC (e.g., the touch sensor IC 253) may be configured to, when it is identified that the interval of the first driving signal has been changed while one of the measurement of the self-capacitance and the measurement of the mutual capacitance is performed in the second interval, alternately measure the self-capacitance and the mutual capacitance in response to each of two continuous first driving signals.

According to various embodiments, the touch sensor IC (e.g., the touch sensor IC 253) may be further configured to calculate the input position, based on information about at least two pre-identified input positions, while alternately measuring the self-capacitance and the mutual capacitance.

According to various embodiments, the touch sensor IC (e.g., the touch sensor IC 253) and the display driving IC (e.g., the DDI 230) may be formed as one or more chips.

According to various embodiments, there is provided an operation method of the electronic device 101 including: a touch sensor (e.g., the touch sensor 251); a touch sensor IC (e.g., the touch sensor IC 253) configured to identify an input position on the touch sensor (e.g., the touch sensor 251); a display (e.g., the display 210); and a display driving IC (e.g., the DDI 230) configured to provide, to the display (e.g., the display 210), at least one driving signal for driving the display (e.g., the display 210), wherein the method may include: measuring, based on a first schedule, the input position on the touch sensor (e.g., the touch sensor 251) while a first driving signal among the at least one driving signal is provided from the display driving IC (e.g., the DDI 230) in a first interval, the first schedule being configured such that the at least one driving signal does not overlap a time period of the measurement of the input position; detecting, based on a change of an interval of the first driving signal from the first interval to a second interval, an event in which the time period of the first driving signal being provided at least partially overlaps the time period of the measurement of the input position; and based on detecting the event, measuring the input position, based on a second schedule which is different from the first schedule.

According to various embodiments, the measuring of the input position on the touch sensor (e.g., the touch sensor 251), based on the first schedule, while the first driving signal is provided in the first interval may include measuring the input position a first number of times within a time period of the first interval; and the measuring of the input position, based on the second schedule, may include measuring the input position a second number of times, which is different from the first number of times, within a time period of the second interval, while the first driving signal is provided in the second interval.

According to various embodiments, the measuring of the input position, based on the second schedule different from the first schedule, may include measuring, based on reception of a first driving signal following one of first driving signals, the input position the second number of times within the time period of the second interval when detecting an event in which a time period of the one of the first driving signals being provided at least partially overlaps the time period of the measurement of the input position.

According to various embodiments, the measuring of the input position, based on the second schedule, may include measuring the input position independently of the first driving signal after at least a part of a time period of one of first driving signals being provided has elapsed when detecting an event in which the at least part of the time period of the one of the first driving signals being provided overlaps the time period of the measurement of the input position.

According to various embodiments, the operation method of the electronic device 101 may further include, when it is determined that an interval of the first driving signal has been changed while the input position is measured independently of the first driving signal, measuring the input position a second number of times, which is different from the first number of times, within a time period of the interval in which the change is completed.

According to various embodiments, a structure (e.g., the display device 160) may include: a substrate (e.g., the substrate 350) on which a TFT structure (e.g., the TFT structure 351) for displaying at least one screen is disposed; an encapsulation layer (e.g., the encapsulation layer 320) disposed on the TFT structure (e.g., the TFT structure 351); a touch sensor (e.g., the touch sensor 251) disposed on the encapsulation layer (e.g., the encapsulation layer 320); and an integrated circuit (e.g., the DDI 230 and/or touch sensor IC 253) configured to identify an input position on the touch sensor (e.g., the touch sensor 251) and provide at least one driving signal to the TFT structure (e.g., the TFT structure 351), wherein the integrated circuit (e.g., the DDI 230 and/or touch sensor IC 253) is configured to: measure, based on a first schedule, the input position on the touch sensor (e.g., the touch sensor 251) while a first driving signal among the at least one driving signal is provided in a first interval, the first schedule being configured such that the at least one driving signal does not overlap a time period of the measurement of the input position; detect, based on a change of an interval of the first driving signal from the first interval to a second interval, an event in which a time period of the first driving signal being provided at least partially overlaps the time period of the measurement of the input position; and measure the input position, based on a second schedule which is different from the first schedule.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a touch sensor;
   a touch sensor integrated circuit (IC) configured to identify an input position on the touch sensor by providing signal to the touch sensor;
   a display; and
   a display driving IC configured to provide, to the display, at least one first driving signals and at least one second driving signals for driving the display,
   wherein the touch sensor IC is further configured to:
      measure, the input position by providing at least one signal to the touch sensor based on a first schedule, while the at least one first driving signals is provided from the display driving IC in a first interval, the first schedule being configured such that the at least one first driving signals does not overlap a time period of measuring the input position, and, the at least one first driving signals and the at least one second driving signals being provided do not overlap the at least one signal provided to the touch sensor in the time period of measuring the input position,
      detect, based on a change of an interval of first driving signals from the first interval to a second interval, an event in which one of the at least one first driving signals being provided at least partially overlaps the time period of measuring the input position, and
      based on detecting the event, measure the input position by providing at least one signal to the touch sensor based on a second schedule which is different from the first schedule.

2. The electronic device of claim 1, wherein the touch sensor IC is further configured to:
   as at least a part of the measuring of the input position by providing at least one signal to the touch sensor based on the first schedule, while the at least one first driving signals is provided in the first interval, measure the input position a first number of times within a time period of the first interval, and
   as at least a part of the measuring of the input position by providing at least one signal to the touch sensor based on the second schedule, measure the input position a second number of times, which is different from the first number of times, within a time period of the second interval, while at least one first driving signal is provided in the second interval.

3. The electronic device of claim 2, wherein the touch sensor IC is configured to, as at least a part of the measuring of the input position by providing at least one signal to the touch sensor based on the second schedule different from the first schedule, measure, based on reception of another first driving signal following the one of the at least one first driving signals, the input position the second number of times within the time period of the second interval when detecting an event in which the one of the at least one first driving signals being provided at least partially overlaps the time period of measuring the input position.

4. The electronic device of claim 1, wherein the touch sensor IC is configured to, as at least a part of the measuring of the input position by providing at least one signal to the touch sensor based on the second schedule different from the first schedule, measure the input position independently of the at least one first driving signals after at least a part of the time period of the one of the at least one first driving signals being provided has elapsed when detecting an event in which the one of the at least one first driving signals being provided overlaps the time period of measuring the input position.

5. The electronic device of claim 4,
   wherein the display driving IC is further configured to change the interval of the first driving signals, and
   wherein the touch sensor IC is further configured to, when it is identified that the interval of the first driving signals has been changed while the input position is measured independently of the at least one first driving signals, measure the input position a second number of times, which is different from a first number of times, within a time period of the interval in which the change is completed.

6. The electronic device of claim 5, wherein the touch sensor IC is further configured to identify that the interval of the first driving signals has been changed, based on receiving a notification indicating that the interval of the first driving signals has been changed or on identifying that a time interval between two first driving signals is a predesignated time interval.

7. The electronic device of claim 1, wherein the touch sensor IC is configured to, as at least a part of the measuring of the input position on the touch sensor, by providing at least one signal to the touch sensor based on the first schedule, while the first driving signals are provided in the first interval, measure the input position a first number of times within a time period of the first interval, the measuring of the input position comprising measuring a mutual capacitance of at least one pair of multiple electrodes included in the touch sensor and a self-capacitance of at least one of the multiple electrodes.

8. The electronic device of claim 7, wherein the touch sensor IC is further configured to change a time period of at least one of measuring the self-capacitance or measuring the mutual capacitance when an event for changing the time period of the at least one of measuring the self-capacitance or measuring the mutual capacitance is detected.

9. The electronic device of claim 8, wherein the touch sensor IC is further configured to measure the input position a second number of times, which is different from the first number of times, within a time period of the second interval, based on changing of the time period of the at least one of measuring the self-capacitance or measuring the mutual capacitance.

10. The electronic device of claim 9, wherein the touch sensor IC is configured to, as at least a part of the measuring of the input position by providing at least one signal to the touch sensor based on the second schedule, alternately measure the self-capacitance and the mutual capacitance in response to each of two continuous first driving signals.

11. The electronic device of claim 10, wherein the touch sensor IC is further configured to calculate the input position, based on information about at least two pre-identified input positions, while alternately measuring the self-capacitance and the mutual capacitance.

12. The electronic device of claim 9, wherein the touch sensor IC is configured to, as at least a part of the measuring of the input position by providing at least one signal to the touch sensor based on the second schedule, perform one of measuring the self-capacitance and measuring the mutual capacitance in the second interval at a bridge driving interval at which an interval of the first driving signals is changed.

13. The electronic device of claim 12, wherein the touch sensor IC is configured to, when it is identified that the interval of the first driving signals has been changed while one of measuring the self-capacitance and measuring the mutual capacitance is performed in the second interval, alternately measure the self-capacitance and the mutual capacitance in response to each of two continuous first driving signals.

14. The electronic device of claim 13, wherein the touch sensor IC is further configured to calculate the input position, based on information about at least two pre-identified input positions, while alternately measuring the self-capacitance and the mutual capacitance.

15. The electronic device of claim 1, wherein the touch sensor IC and the display driving IC are formed as one or more chips.

16. A method of operating an electronic device, the method comprising:
measuring an input position by providing at least one signal to a touch sensor of the electronic device based on a first schedule, while at least one first driving signals is provided from a display driving integrated circuit (IC) of the electronic device in a first interval, the first schedule being configured such that the at least one first driving signals does not overlap a time period of measuring the input position, and, the at least one first driving signals and the at least one second driving signals being provided does not overlap the at least one signal provided to the touch sensor in the time period of measuring the input position;
detecting, based on a change of an interval of first driving signals from the first interval to a second interval, an event in which one of the at least one first driving signals being provided at least partially overlaps the time period of measuring the input position; and
based on detecting the event, measuring the input position by providing at least one signal to the touch sensor based on a second schedule which is different from the first schedule.

17. The method of claim 16,
wherein the measuring of the input position by providing at least one signal to the touch sensor, based on the first schedule, while the at least one first driving signals is provided in the first interval comprises measuring the input position a first number of times within a time period of the first interval, and
wherein the measuring of the input position by providing at least one signal to the touch sensor based on the second schedule, comprises measuring the input position a second number of times, which is different from the first number of times, within a time period of the second interval, while at least one first driving signal is provided in the second interval.

18. The method of claim 17, wherein the measuring of the input position by providing at least one signal to the touch sensor based on the second schedule different from the first schedule, comprises measuring, based on reception of another first driving signal following the one of the at least one first driving signals, the input position the second number of times within the time period of the second interval when detecting an event in which the one of the at least one first driving signals being provided at least partially overlaps the time period of measuring the input position.

19. The method of claim 16, wherein the measuring of the input position by providing at least one signal to the touch sensor based on the second schedule different from the first schedule, comprises measuring the input position independently of the at least one first driving signals after at least a part of the time period of the one of the at least one first driving signals being provided has elapsed when detecting an event in which the one of the at least one first driving signals being provided overlaps the time period of measuring the input position.

20. A structure comprising:
a substrate on which a thin film transistor (TFT) structure for displaying at least one screen is disposed;
an encapsulation layer disposed on the TFT structure;
a touch sensor disposed on the encapsulation layer; and
an integrated circuit configured to identify an input position on the touch sensor by providing signal to the touch sensor and provide at least one first driving signals and at least one second driving signals to the TFT structure,
wherein the integrated circuit is further configured to:
measure the input position by providing at least one signal to the touch sensor based on a first schedule, while at least one first driving signals is provided in a first interval, the first schedule being configured such that the at least one first driving signals does not overlap a time period of measuring the input position, and, the at least one first driving signals and the at least one second driving signals being provided do not overlap the at least one signal provided to the touch sensor in the time period of measuring the input position, detect, based on a change of an interval of first driving signals from the first interval to a second interval, an event in which one of the at least one first driving signals being provided at least partially overlaps the time period of measuring the input position, and measure the input position by providing at least one signal to the touch sensor based on a second schedule which is different from the first schedule.

* * * * *